(12) United States Patent
Takahashi

(10) Patent No.: US 10,832,491 B2
(45) Date of Patent: Nov. 10, 2020

(54) EDITING DEVICE FOR THREE-DIMENSIONAL SHAPE DATA, AND NON-TRANSITORY COMPUTER READABLE MEDIUM

(71) Applicant: FUJI XEROX CO., LTD., Tokyo (JP)

(72) Inventor: Tomonari Takahashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 32 days.

(21) Appl. No.: 15/893,946

(22) Filed: Feb. 12, 2018

(65) Prior Publication Data

US 2018/0330553 A1 Nov. 15, 2018

(30) Foreign Application Priority Data

May 11, 2017 (JP) ................................ 2017-094495

(51) Int. Cl.
*G06T 15/40* (2011.01)
*G06T 19/20* (2011.01)

(52) U.S. Cl.
CPC ............. *G06T 19/20* (2013.01); *G06T 15/40* (2013.01); *G06T 2210/21* (2013.01); *G06T 2219/2004* (2013.01); *G06T 2219/2021* (2013.01)

(58) Field of Classification Search
CPC ..... G06T 15/40; G06T 19/20; G06T 2210/21; G06T 2219/2004; G06T 2219/2021
See application file for complete search history.

(56) References Cited

U.S. PATENT DOCUMENTS

| | | | |
|---|---|---|---|
| 6,069,634 A | 5/2000 | Gibson | |
| 6,728,424 B1 | 4/2004 | Zhu et al. | |
| 2002/0107673 A1 | 8/2002 | Haller et al. | |
| 2004/0222987 A1* | 11/2004 | Chang | G01B 11/2509 345/419 |
| 2016/0148401 A1* | 5/2016 | Hirai | G06T 11/008 382/131 |
| 2017/0258526 A1* | 9/2017 | Lang | H05K 999/99 |

FOREIGN PATENT DOCUMENTS

| | | |
|---|---|---|
| JP | 10-208078 A | 8/1998 |
| JP | 2004-508856 A | 3/2004 |
| JP | 2004-102979 A | 4/2004 |

OTHER PUBLICATIONS

Wu et al., "TouchSketch: a touch-based interface for 3D object manipulation and editing", Virtual Reality Software and Technology, ACM, Nov. 13, 2015, XP058077495, pp. 59-68 (total 10 pages).
Communication dated Oct. 1, 2018 from the European Patent Office in counterpart Application No. 18160376.2.

* cited by examiner

*Primary Examiner* — Sing-Wai Wu
(74) *Attorney, Agent, or Firm* — Sughrue Mion, PLLC

(57) ABSTRACT

An editing device for three-dimensional shape data includes: an extraction unit that extracts an overlap region between a first three-dimensional shape to be edited and a second three-dimensional shape that overlaps with the first three-dimensional shape, out of multiple three-dimensional shapes represented by three-dimensional shape data; and a control unit that controls editing of the first three-dimensional shape so that the overlap region extracted by the extraction unit is not lost.

23 Claims, 23 Drawing Sheets

EDITING DEVICE FOR THREE-DIMENSIONAL SHAPE DATA, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-094495 filed on May 11, 2017.

BACKGROUND

Technical Field

The present invention relates to an editing device for three-dimensional shape data, and a non-transitory computer readable medium storing a program for editing three-dimensional shape data.

SUMMARY

According to an aspect of the invention, there is provided an editing device for three-dimensional shape data, including: an extraction unit that extracts an overlap region between a first three-dimensional shape to be edited and a second three-dimensional shape that overlaps with the first three-dimensional shape, out of multiple three-dimensional shapes represented by three-dimensional shape data; and a control unit that controls the editing of the first three-dimensional shape so that the overlap region extracted by the extraction unit is not lost.

BRIEF DESCRIPTION OF THE DRAWINGS

Exemplary embodiments of the present invention will be described in detail based on the following figures, wherein.

DETAILED DESCRIPTION

Hereinafter, an exemplary embodiment for carrying out the present disclosure will be described in detail with reference to the drawings.

First Exemplary Embodiment

Figure 1:
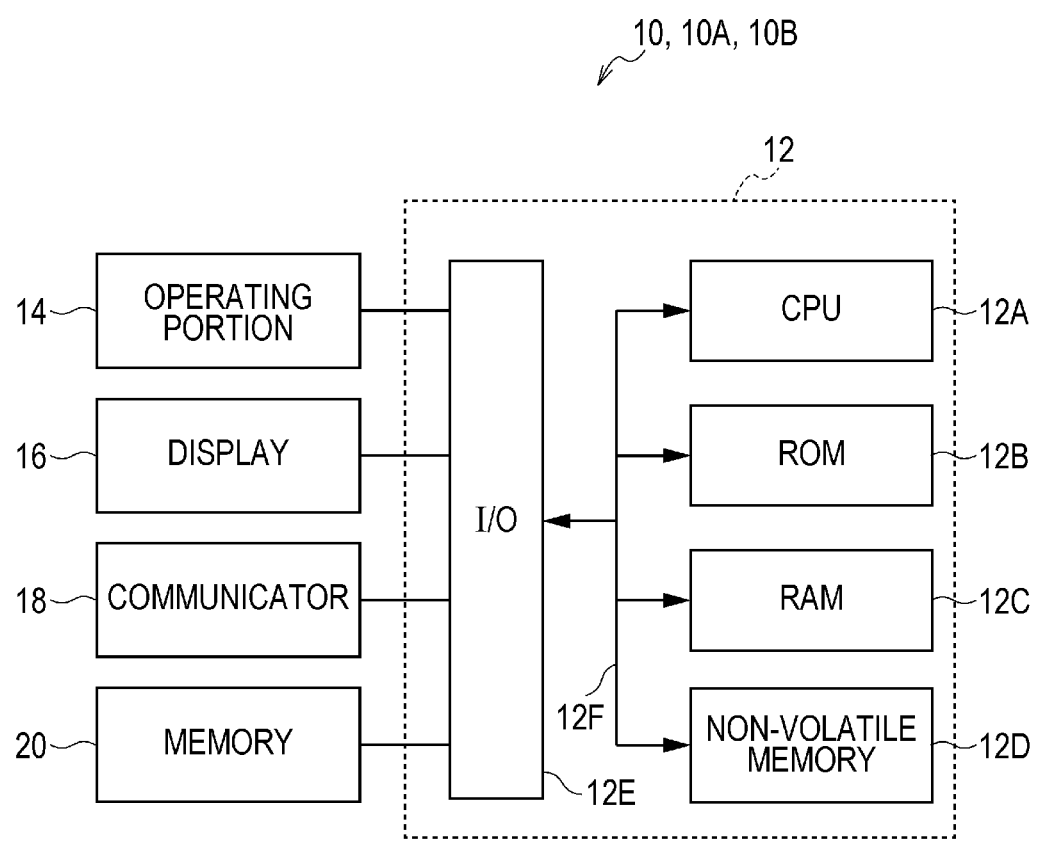
FIG. 1 is a diagram illustrating a configuration example of an editing device.

First, referring to FIG. 1, the configuration of an editing device 10 for three-dimensional shape data according to the exemplary embodiment will be described.

The editing device 10 is configured by, for instance, a personal computer, and includes a controller 12. The controller 12 includes a central processing unit (CPU) 12A, a read only memory (ROM) 12B, a random access memory (RAM) 12C, a non-volatile memory 12D, and an input/output (I/O) interface 12E. The CPU 12A, the ROM 12B, the RAM 12C, the non-volatile memory 12D, and the I/O 12E are connected to each other via a bus 12F.

Also, the I/O 12E is connected to an operating portion 14, a display 16, a communicator 18, and a memory 20. It is to be noted that the CPU 12A is an example of the extraction unit, the control unit, and the selection unit, and the operating portion 14 is an example of the receiving unit.

The operating portion 14 is configured to include an input device such as a mouse, a keyboard, or a touch panel that receives an instruction from a user of the editing device 10, for instance.

The display 16 is configured to include a display device such as a liquid crystal display and an organic electro luminescence (EL) display, for instance.

The communicator 18 is connected to a communication line, for instance, the Internet or a local area network (LAN), and has an interface for performing data communication with an external device such as a personal computer connected to the communication line.

The memory 20 includes a non-volatile memory device such as a hard disk, and stores three-dimensional shape data and the like generated by the editing device 10.

Figure 2:
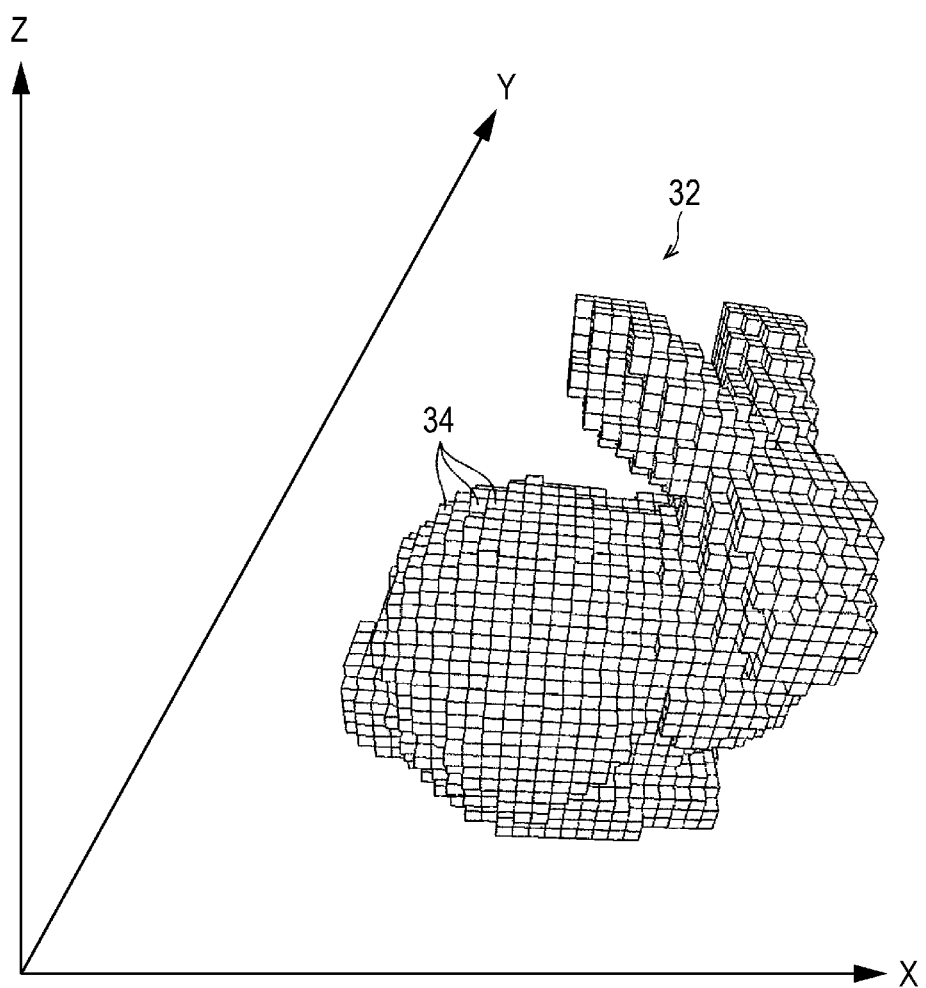
FIG. 2 is a diagram illustrating an example of a three-dimensional shape.

FIG. 2 is a diagram illustrating an example of a three-dimensional shape 32 represented by three-dimensional shape data. As illustrated in FIG. 2, the editing device 10 expresses the three-dimensional shape 32 using three-dimensional coordinates (hereinafter referred to as a "three-dimensional coordinate space") formed by X-axis, Y-axis, and Z-axis.

In this exemplary embodiment, a case will be described where as a data format for three-dimensional shape data, the data format that represents the three-dimensional shape 32 by a set of voxels 34 is used. However, another data format may be used.

Here, the voxels 34 are each a basic element of the three-dimensional shape 32, and for instance, a rectangular parallelepiped is used. However, without being limited to a rectangular parallelepiped, a sphere or a cylinder may be used. A desired three-dimensional shape 32 is represented by stacking the voxels 34. Also, for each voxel 34, an attribute indicating a property of the voxel 34, for instance, a color, strength, a material, or a texture is specified, and the color or the material of the three-dimensional shape 32 is represented by presence of the voxel 34 and the attribute of the voxel 34.

Here, the "material" includes at least one of information indicating a genre of material such as resin, metal, or rubber, information indicating a material name such as ABS, PLA, information indicating a product name, a product number of a commercially available material, information indicating a material such as a material name an abbreviation, and a number which are defined in a standard such as ISO, JIS, and information indicating material characteristics such as a thermal conductivity, an electrical conductivity, and magnetism.

Furthermore, the "texture" refers to an attribute indicating not only a color, but also appearance or touch of three-dimensional shape data, such as a reflectivity, a transmittance, gloss, and a surface property thereof.

It is to be noted that the attribute includes an attribute pattern which is set using at least one of a period, an expression, and another three-dimensional shape data. The attribute pattern includes at least one of repeat of a constant period, gradation, representation by a slope or a local point expressed by an expression, continuous modification of the color, material, or texture of three-dimensional shape data in accordance with another three-dimensional shape data, and filling or continuously modifying a specified range of three-dimensional shape data with a specified pattern.

As described above, the three-dimensional shape 32 is represented by a set of voxels 34, and specifically is represented by, for instance, an element value of X, Y, Z coordinates in a three-dimensional coordinate space. Let (X, Y, Z) represent coordinates in a three-dimensional coordinate space, then when a voxel 34 is present at the coordinates (X, Y, Z), "(X, Y, Z)=1" is set. On the other hand, when a voxel 34 is not present at the coordinates (X, Y, Z), the three-dimensional shape 32 is represented by setting "(X, Y, Z)=1". In other words, three-dimensional shape data includes the element value of the coordinates (X, Y, Z), which indicates the presence or absence of the voxel 34, and an attribute associated with the voxel 34 having an element value of "1".

It is to noted that the three-dimensional shape 32 is not necessarily represented by coordinates (X, Y, Z) in a three-dimensional coordinate space. For instance, the three-dimensional shape 32 may be represented by index numbers each uniquely associated with coordinates (X, Y, Z). In this case, for instance when the value associated with an index number is "1", this means that a voxel 34 is present at the position indicated by the index number.

In addition, no restriction is imposed on the shape of the three-dimensional shape 32, and the three-dimensional shape 32 may be any shape as long as the shape is represented by using three-dimensional shape data.

Next, the operation of edit processing of three-dimensional shape data representing the three-dimensional shape 32 will be described. In the following description, in order describe editing of three-dimensional shape data in a three-dimensional coordinate space in an understandable way, a description is given using a projection view of the three-dimensional shape 32 projected on the XZ plane. In the projection view of the XZ plane, the shape of the three-dimensional shape 32 in the Y-axis direction is not illustrated. However, when three-dimensional shape data is edited in the Y-axis direction, the same processing as the below-described editing of three-dimensional shape data on the XZ plane is performed.

Also, in the following description, a case will be described where three-dimensional shape data is edited so that different three-dimensional shapes 32 overlap with each other. Here, "overlap" refers to a state in which a portion of one three-dimensional shape 32 comes into contact with the other three-dimensional shape 32. Specifically, "overlap" refers to a state in which the surface of one three-dimensional shape 32 comes into contact with the surface of the other three-dimensional shape 32, or a state in which portions of three-dimensional shapes 32 are contracted, duplicated.

When a model object which is integrally configured including multiple three-dimensional shapes 32 is edited, if a three-dimensional shape 32, which does not overlap with any of other three-dimensional shapes 32, is generated by the editing, the three-dimensional shape 32 leaves the model object, and does not serve as the part of the model.

Thus, the restrictions that three-dimensional shape data be edited so that different three-dimensional shapes 32 overlap with each other, in other words, the restrictions that three-dimensional shape data be edited so that a region (overlap region) where different three-dimensional shapes 32 overlap with each other are not lost are necessary restrictions on editing a model object which is integrally configured including multiple three-dimensional shapes 32.

It is desirable that the restrictions be applied when different three-dimensional shapes 32 are combined to generate integrated three-dimensional shape data, and a single model object is created. In other words, the restrictions are not applicable to a case where three-dimensional shape data of a model object with multiple independent parts assembled is generated. However, the restrictions are necessary when three-dimensional shape data of single part included in a group of multiple independent parts is generated.

Figure 3:
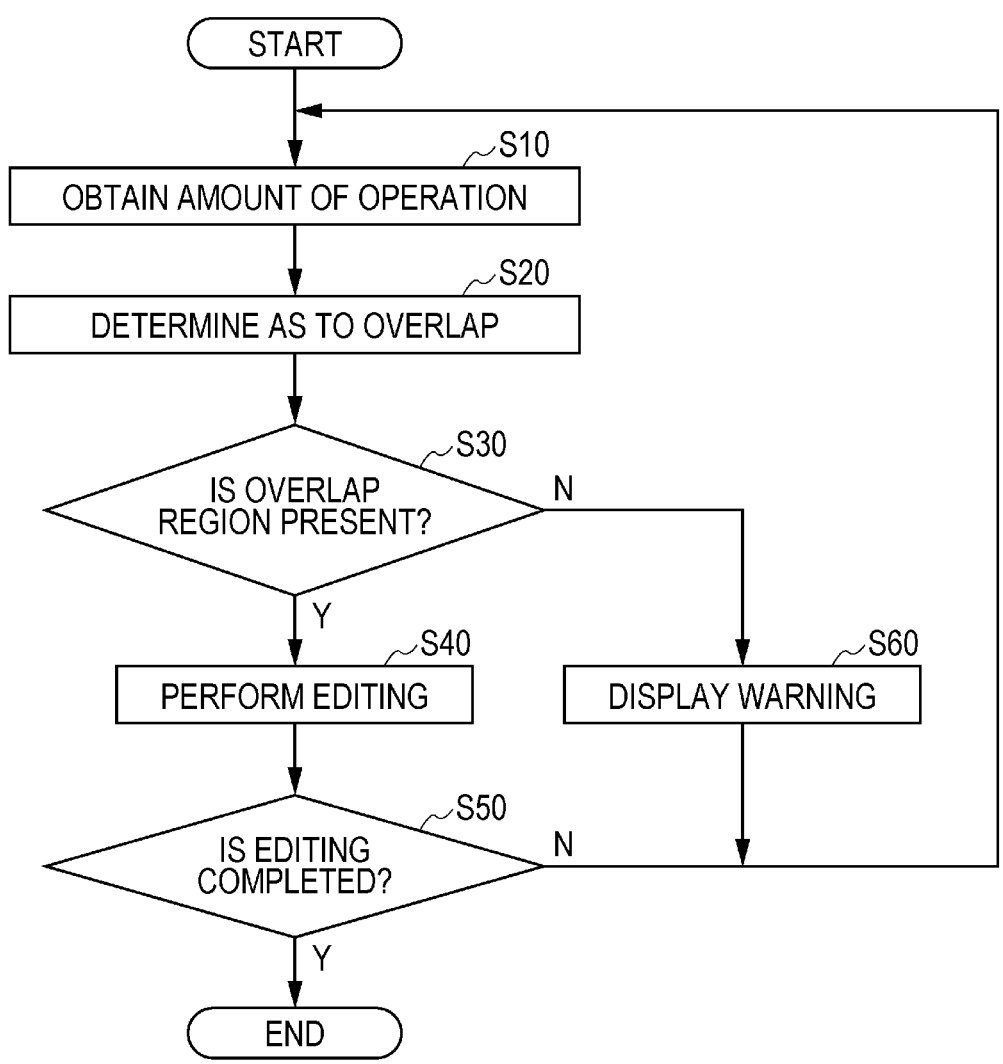
FIG. 3 is a flowchart illustrating an example of a flow of edit processing of three-dimensional shape data according to a first exemplary embodiment.

FIG. 3 is a flowchart illustrating an example of a flow of edit processing of three-dimensional shape data performed by the editing device 10. An editing program, which defines the edit processing of three-dimensional shape data, is pre-stored in the ROM 12B, and for instance, when receiving an edit start instruction for the three-dimensional shape 32 from a user, the CPU 12A reads the editing program from the ROM 12B and executes the editing program.

First, in step S10, the CPU 12A obtains an amount of operation for the three-dimensional shape 32, associated with editing.

Here, the "edit" includes modification of at least part of the three-dimensional shape 32 by performing processing such as deformation, enlargement, reduction, movement, rotation, addition, deletion, replacement, and composition, on the at least part of the three-dimensional shape 32.

Also, the "edit" includes modification of an attribute of at least part of the three-dimensional shape 32 by performing processing such as addition, deletion, modification, substitution, and composition on at least part of at least one attribute of color, strength, material, and texture assigned to three-dimensional position information.

Figure 4:
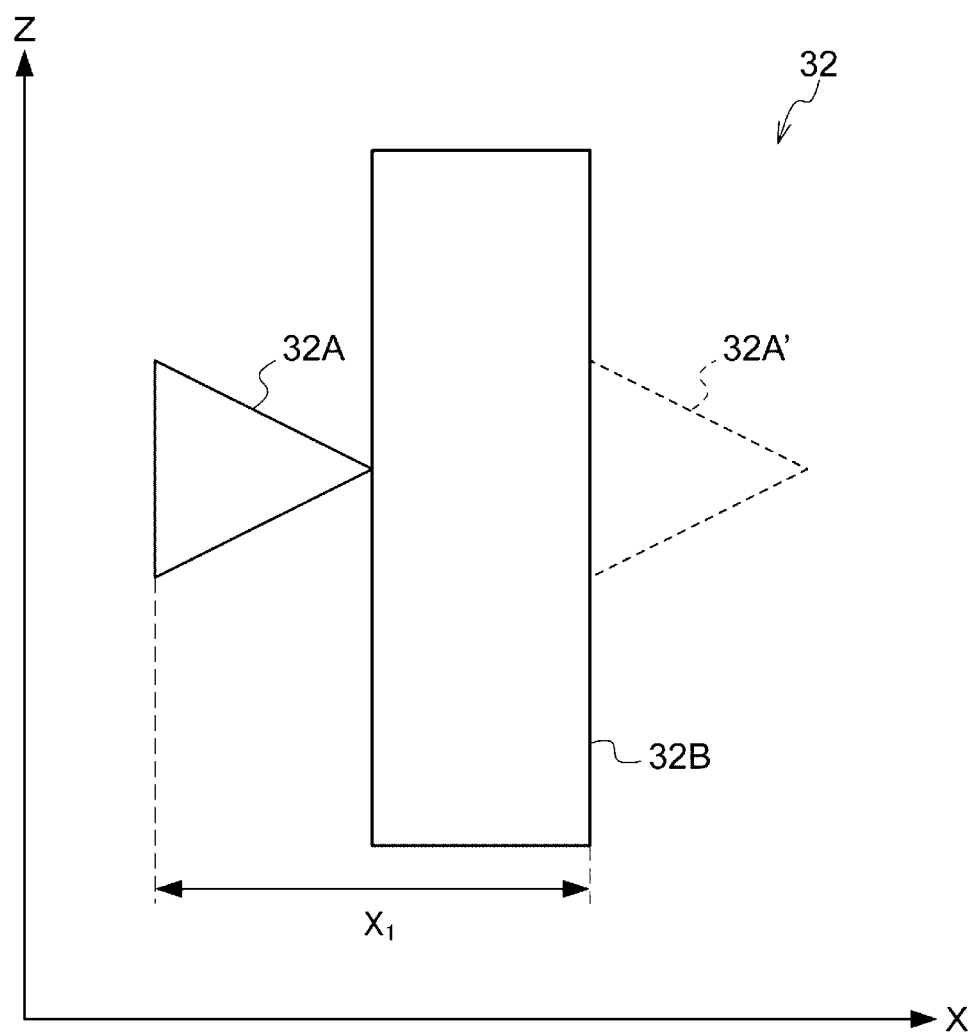
FIG. 4 is a diagram illustrating an example of editing of a three-dimensional shape.

FIG. 4 is a diagram illustrating an example of editing to move the three-dimensional shape 32. The three-dimensional shape 32 is configurated to include a three-dimensional shape 32A and a three-dimensional shape 32B. For instance, when the three-dimensional shape 32A is moved in the X-axis direction while overlapping with the three-dimensional shape 32B, the range of the movement is limited to the range of distance X1, in which the surface of the three-dimensional shape 32A and the surface of the three-dimensional shape 32B are in contact with each other. When the three-dimensional shape 32A is moved by the distance X1, the movement is made to the position of a three-dimensional shape 32A', and as long as the movement distance of the three-dimensional shape 32A is less than or equal to the distance X1, the three-dimensional shape 32A overlaps with the three-dimensional shape 32B for any such distance.

The CPU1 2A recognizes at least one three-dimensional shape 32 (the three-dimensional shape 32A in this case) selected with a mouse or the like by a user from multiple three-dimensional shapes 32 as a target for editing. In addition, the CPU 12A obtains a movement amount and a movement direction of the mouse as an amount of operation of the selected three-dimensional shape 32A from the operating portion 14. It is to be noted that three-dimensional shape 32B not selected as the target for editing out of three-dimensional shape 32 may be referred to as "three-dimensional shape 32B serving as the base".

In step S20, the CPU1 2A determines whether or not editing of the three-dimensional shape 32A corresponding to the amount of operation obtained in step S10 overlaps with the three-dimensional shape 32B serving as the base. The CPU 12A then stores a result of the determination in the RAM 12C, for instance. Whether or not the three-dimensional shape 32A overlaps with the three-dimensional shape 32B is determined by a bitwise operation, for instance.

Figure 5:
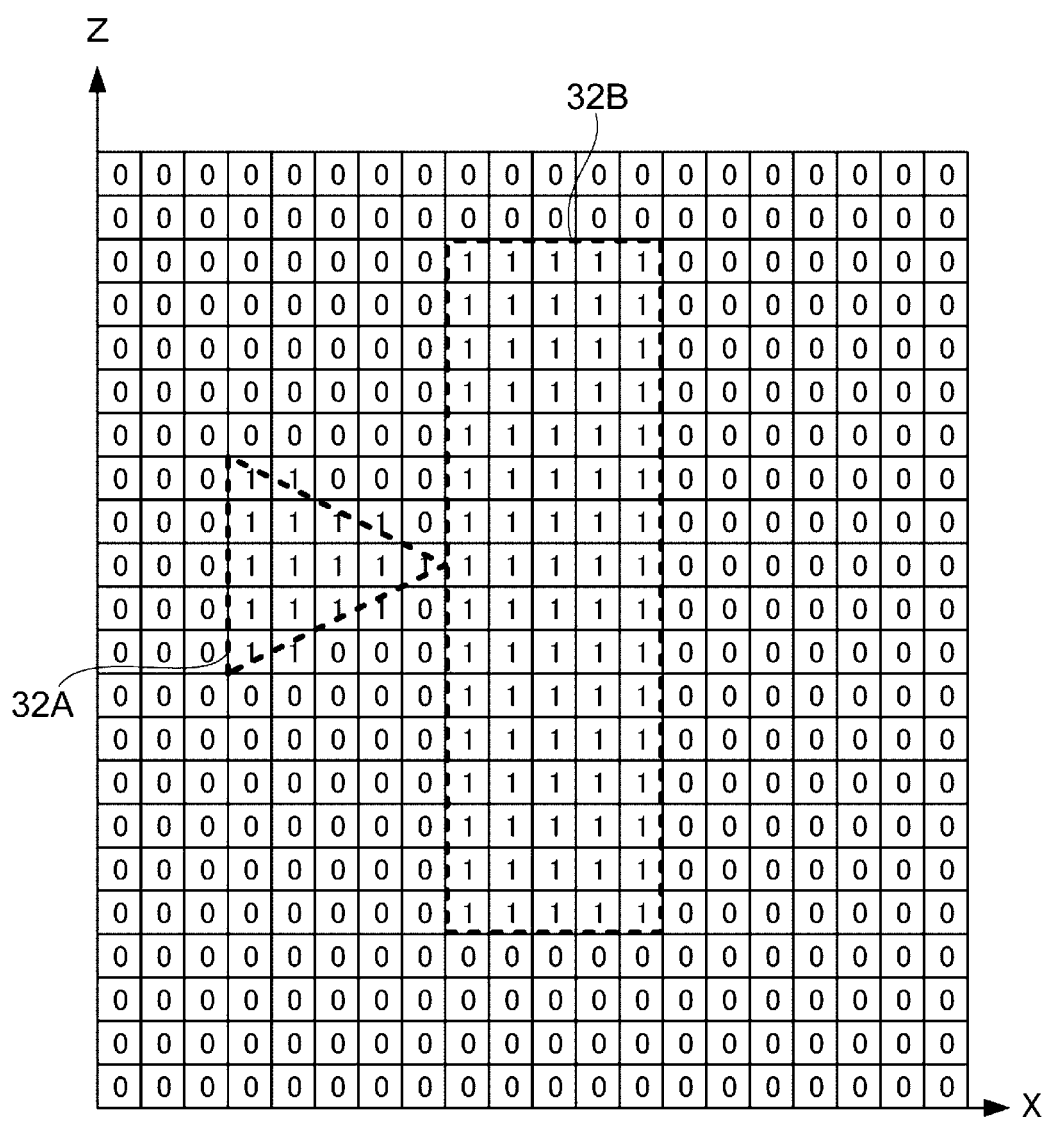
FIG. 5 is a diagram illustrating an example in which a three-dimensional shape is represented by a bit sequence.

FIG. 5 is a diagram illustrating an example in which the three-dimensional shape 32 illustrated in FIG. 4 is represented by a bit sequence which indicates the presence or absence of a voxel 34. As described above, when even part of voxels 34 which model the three-dimensional shape 32 is present at corresponding position coordinates, the element value of the coordinates is "1", and when no voxel 34 is present at corresponding position coordinates, the element value of the coordinates is "0".

The CPU 12A calculates the position of the edited three-dimensional shape 32A based on the amount of operation obtained in step S10, and represents the three-dimensional shape 32A and the three-dimensional shape 32B each by a bit sequence in the three-dimensional coordinate space under the assumption that the three-dimensional shape 32A is at the calculated position. The CPU 12A then performs an AND operation on a bit sequence representing the three-dimensional shape 32A and a bit sequence representing the three-dimensional shape 32B to extract an overlap region, and determines whether or not editing to cause overlap with the three-dimensional shape 32B has been performed on the three-dimensional shape 32A.

Figure 6:
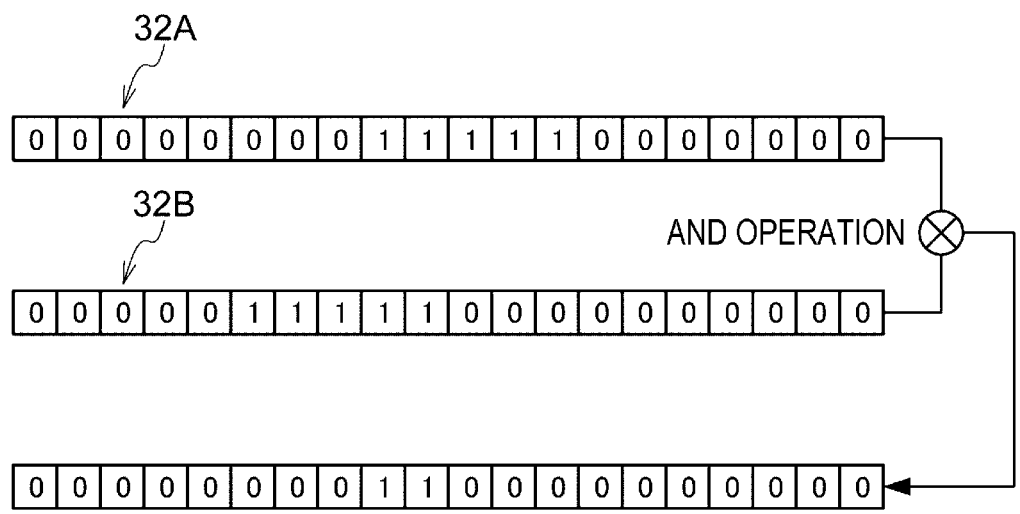
FIG. 6 is a diagram illustrating an example of an AND operation on bit sequences that represent a three-dimensional shape.

FIG. 6 is a diagram illustrating an example of bit sequences of the three-dimensional shape 32A and the three-dimensional shape 32B in the same space extracted from a three-dimensional coordinate space.

The CPU 12A performs an AND operation on the bit sequences of the three-dimensional shape 32A and the bit sequence of the three-dimensional shape 32B, when "1" is included in an obtained operation result, determines that the three-dimensional shape 32A and the three-dimensional shape 32B overlap with each other. Here, although an example of one row in the bit sequences of the three-dimensional shapes 32A, 32B projected on the XZ plane is illustrated, bit sequences are also present in the Y-axis direction, and it goes without saying that when "1" is included in the AND operation result of one of the bit sequences, it is determined that the three-dimensional shape 32A and the three-dimensional shape 32B overlap with each other.

It is to be noted that even when a data format other than the voxel 34 is used as the data format for representing a three-dimensional shape, an overlap region can be advantageously extracted at high speed by representing a three-dimensional shape with bit sequences and performing the AND operation on the bit sequences as illustrated in FIG. 6. Thus, the three-dimensional shape may be voxelized to make determination as to presence of overlap. In this case, the entire three-dimensional shape may be voxelized, or only a necessary range may be voxelized.

For instance, let bounding box A be a range including the three-dimensional shape 32A, and bounding box B be a range including the three-dimensional shape 32A, then the "necessary range" indicates the portions of the three-dimensional shapes 32A, 32B included in the intersection region between the bounding box A and the bounding box B. Each three-dimensional shape may be temporarily voxelized, and the voxelized three-dimensional shape may be discarded, for instance when the overlap determination is completed, or data of the voxelized shape may be stored in preparation for overlap determination next time.

It is to be noted that in order to extract an overlap region, the three-dimensional shape does not have to be voxelized. It is sufficient that a necessary range in the three-dimensional shape be represented by bit sequences. For instance, in a necessary range, a bit sequence may be used, in which the value of the coordinates at which a three-dimensional shape is present is "1", and the value of the coordinates at which a three-dimensional shape is not present is "0".

In addition, in order to extract an overlap region, the AND operation on bit sequences does not have to be performed. For instance, an overlap region may be extracted by making determination of contact between components included in a sufficiently close range, out of components such as a point, a line, and a face, which constitute the three-dimensional shapes 32A, 32B, and by determining the presence of contact or intersection. Here, the "sufficiently close range" may be a predetermined range, or may be derived from the sizes of the three-dimensional shapes 32A, 32B to be edited. For instance, the "sufficiently close range" may be an outer range slightly larger the size of each shape. Alternatively, the range may be derived based on the amount of operation obtained in step S10.

Like this, no particular restriction is imposed on a method of extracting an overlap region between three-dimensional shapes, and a publicly known method used for determination of contact between three-dimensional shapes is applied.

Figure 7:
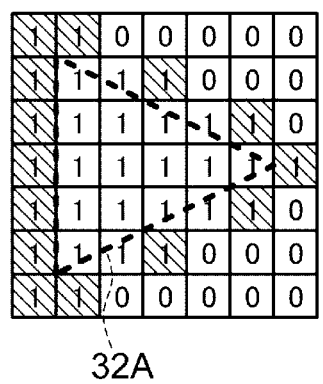
FIG. 7 is a diagram illustrating a representation example of a bit sequence that represents a three-dimensional shape.

It is to be noted that when performing the AND operation, as illustrated in FIG. 7, the CPU 12A changes the element value of the coordinates (the coordinates illustrated by hatching) adjacent to the outline of the three-dimensional shape 32A to be edited from "0" to "1", and performs the AND operation. This is because the case where the surfaces of the three-dimensional shape 32A and the three-dimensional shape 32B are in contact is also determined to be a state of overlap. Such change of the element value of coordinates is temporarily made at the time of AND operation on bit sequences, and after the AND operation, the CPU 12A restores the element value of the coordinates representing the three-dimensional shape 32A to the element value before the change.

Figure 8:
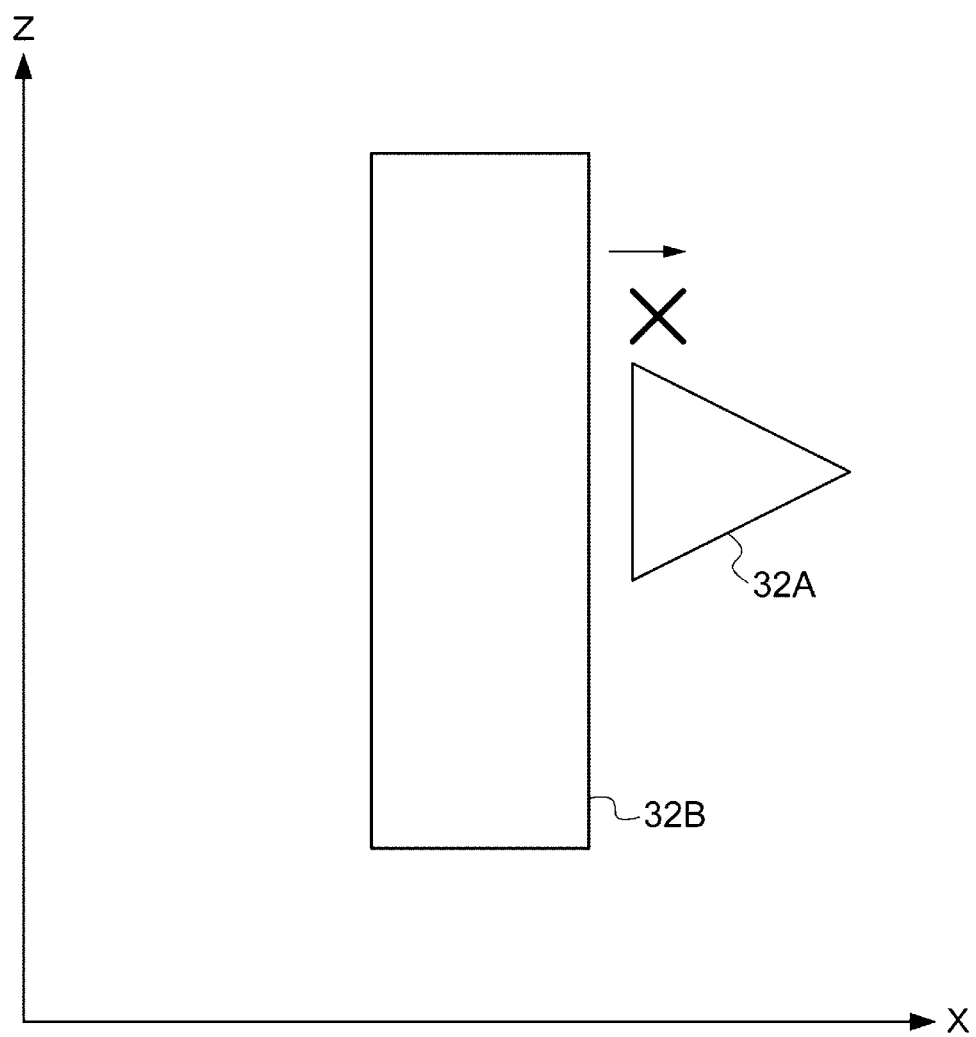
FIG. 8 is a diagram illustrating an example of editing by which one of three-dimensional shapes leaves the other.

In step S30, when the CPU 12A determines that no overlap region is present between the three-dimensional shape 32A and the three-dimensional shape 32B by the overlap determination in step S20, the flow proceeds to step S60. In this case, as illustrated in FIG. 8, it is indicated that the three-dimensional shape 32A is moved so as to leave the three-dimensional shape 32B by a user, for instance.

Thus, in step S60, the CPU 12A displays a warning on the display 16 so that editing is performed without letting the three-dimensional shape 32A to be edited leave the three-dimensional shape 32B serving as the base. Alternatively, a warning may be displayed, then the operation may be automatically resumed to a position at which the three-dimensional shapes 32A, 32B overlap with each other, or the operation may be restricted at a position immediately before the overlap region between the three-dimensional shapes 32A, 32B is lost. It is to be noted that the CPU 12A may notify of a warning by sound.

The flow then proceeds to step S10, and the CPU 12A stays on standby until the amount of the next operation associated with editing is obtained. In other words, the CPU 12A does not perform editing corresponding to the amount of operation obtained in immediately last step S10.

It is to be noted that the overlap determination in step S20 may be made in real time as needed while the operation by a user is performed in step S10. When at least one three-dimensional shape 32 selected with a mouse or the like by a user is recognized as a target to be edited, overlap determination may be made for each of the coordinates for movement of the three-dimensional shape 32 associated with the editing in the three-dimensional coordinate space, and a limit of the amount of operation, within which an overlap range is not lost, is thereby calculated, and the limit may be used for determination of presence of an overlap region in step S30. It goes without saying that when the operation by a user is completed, the overlap determination may be made only once.

On the other hand, when it is determined that an overlap region is present between the three-dimensional shape 32A and the three-dimensional shape 32B in the determination processing in step S30, the flow proceeds to step S40.

In step S40, the CPU 12A performs editing of the three-dimensional shape 32A, the editing corresponding to the amount of operation (for instance, the amount of movement) obtained in step S10. In association with execution of editing, the CPU 12A generates three-dimensional shape data in accordance with the content of the editing, and updates the bit sequences which represent the position of the edited three-dimensional shape 32A.

In step S50, the CPU 12A determines whether or not an instruction for completing editing has been received from a user via the operating portion 14, and when an instruction for completing editing has not been received, the flow proceeds to step S10, and the CPU 12A stays on standby until the amount of the next operation associated with editing is obtained. On the other hand, when an instruction for completing editing has been received, the generated three-dimensional shape data is stored in the storage unit 20, and the edit processing of the three-dimensional shape data illustrated in FIG. 3 is completed.

The edit processing of the three-dimensional shape data illustrated in FIG. 3 has been described for the three-dimensional shape 32 having only one overlap region as in FIG. 4. However, the same processing is performed for the case where multiple overlap regions are present.

Figure 9:
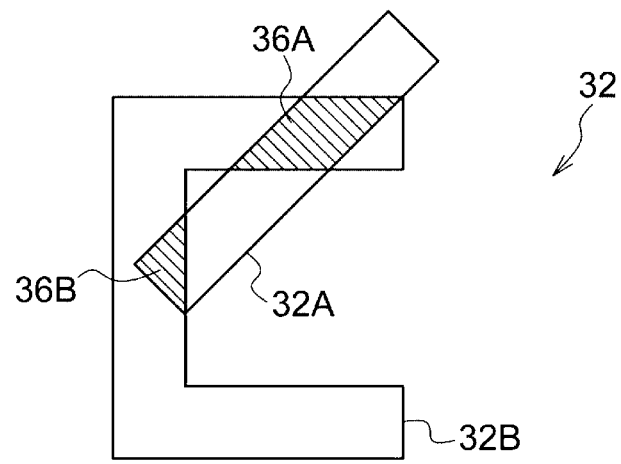
FIG. 9 is a diagram illustrating an example of a three-dimensional shape which has multiple overlap regions.

FIG. 9 is a diagram illustrating an example of the three-dimensional shape 32 having two overlap regions. The three-dimensional shape 32 is configured to include two parts: the three-dimensional shape 32A and the three-dimensional shape 32B. The three-dimensional shape 32 has an overlap region 36A and an overlap region 36B. Hereinafter, the overlap region 36A and the overlap region 36B are each referred to as "overlap region 36" when it is not particularly necessary to distinguish between the overlap regions 36A and 36B.

Figure 10:
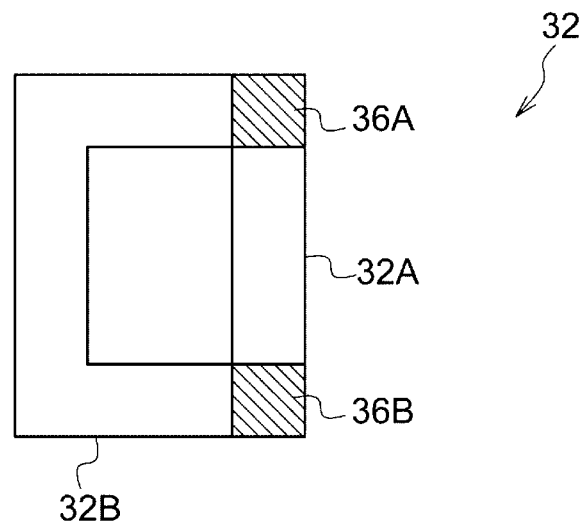
FIG. 10 is a diagram illustrating an example of editing of a three-dimensional shape which has multiple overlap regions.

For instance, when presence of two overlap regions 36 is defined as the restriction conditions for editing of the three-dimensional shape 32, the CPU 12A may determine that the three-dimensional shape 32A overlaps with the three-dimensional shape 32B when two overlap regions 36 are extracted in step S20 of FIG. 3. Thus, the editing device 10 permits editing to cause the three-dimensional shape 32A illustrated in FIG. 9 to move to the three-dimensional shape 32 having two overlap regions 36A, 36B as illustrated in FIG. 10.

Figure 11:
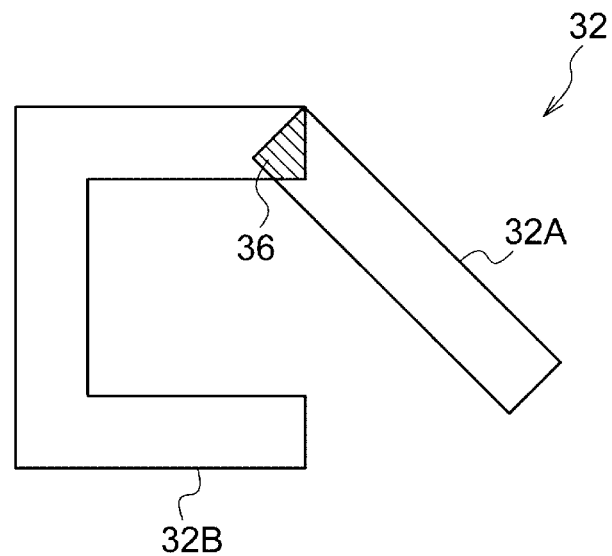
FIG. 11 is a diagram illustrating an example of editing of a three-dimensional shape which has one overlap region.

On the other hand, the editing device 10 displays a warning, and does not permit correction editing to cause the three-dimensional shape 32A illustrated in FIG. 9 to move to the three-dimensional shape 32 having only one overlap region 36 as illustrated in FIG. 11.

However, when presence of at least one overlap region 36 is defined as the restriction conditions for editing of the three-dimensional shape 32, the editing device 10 permits editing to achieve the three-dimensional shape 32 illustrated in FIG. 11.

In this manner, the editing device 10 controls the editing of the three-dimensional shape 32 so that the overlap region 36 is not lost. Consequently, the three-dimensional shape 32A to be edited does not leave the three-dimensional shape 32B serving as the base, and thus the editing device 10 reduces the possibility of editing not intended by a user.

Second Exemplary Embodiment

In the first exemplary embodiment, the editing of the three-dimensional shape data by the editing device 10 has been described using an example of movement of the three-dimensional shape 32. In a second exemplary embodiment, the editing device 10 that edits three-dimensional shape data will be described using a reference point and a reference axis.

As described above, the editing of the editing device 10 includes deformation, enlargement, reduction, rotation, addition, deletion, replacement, and composition in addition to movement of the three-dimensional shape 32. The above-mentioned editing includes processing for modifying the three-dimensional shape 32 using specific point and axis, such as rotation, enlargement, and reduction of the three-dimensional shape 32, for instance. In this case, when the three-dimensional shape 32 is edited, it is necessary to set specific point and axis that serve as a reference for editing the three-dimensional shape 32.

Hereinafter, a specific point that serves as a reference for editing the three-dimensional shape 32 is referred to as a "reference point", and an axis that serves as a reference for the editing is referred to as a "reference axis".

Next, the operation of the edit processing performed by the editing device 10 using a reference point and a reference axis will be described.

Figure 12:
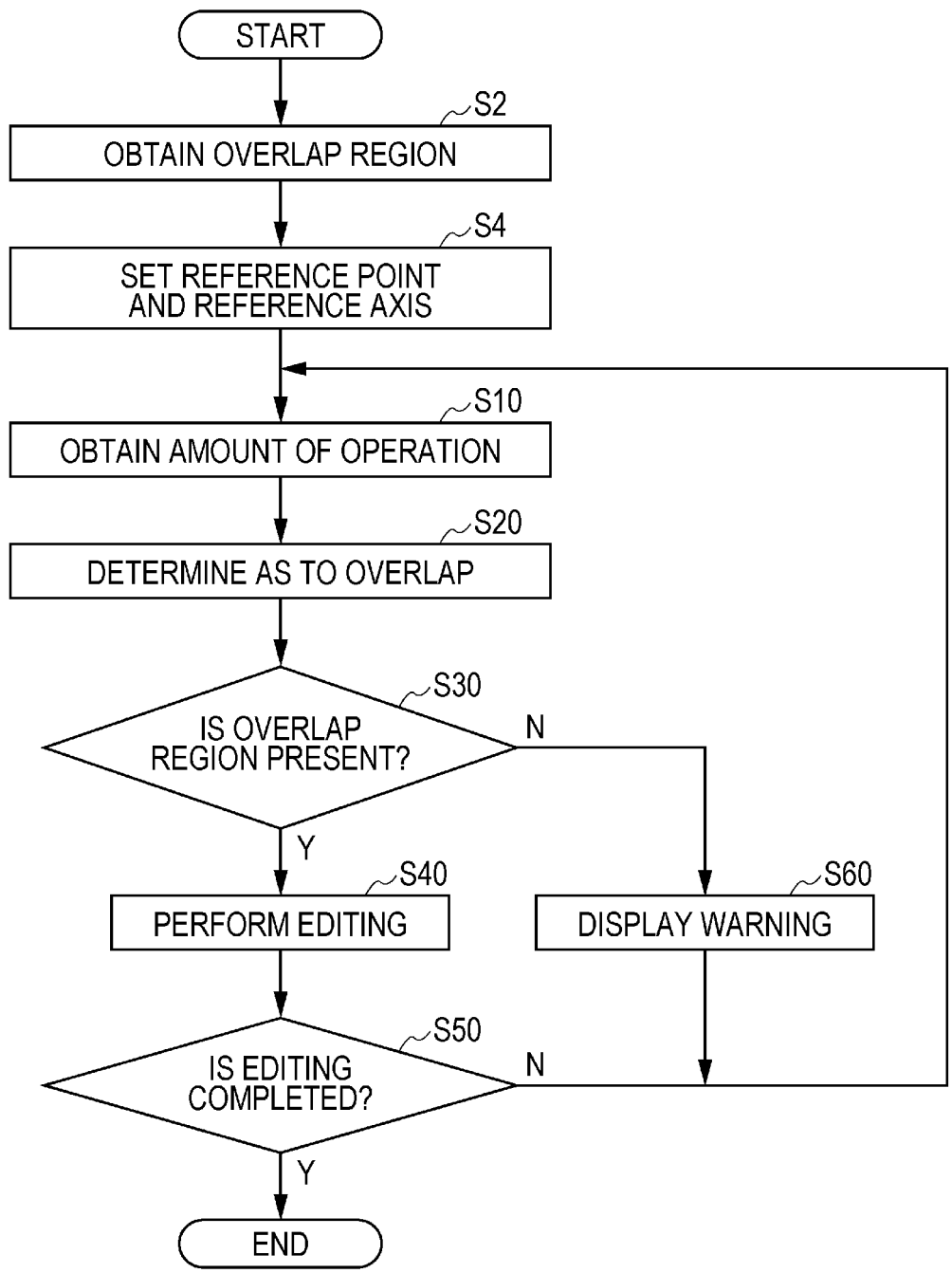
FIG. 12 is a flowchart illustrating an example of a flow of edit processing of three-dimensional shape data according to a second exemplary embodiment.

FIG. 12 is a flowchart illustrating an example of a flow of edit processing of three-dimensional shape data performed by the editing device 10 using a reference point and a reference axis. An editing program, which defines the edit processing of three-dimensional shape data, is pre-stored in the ROM 12B, and for instance, when receiving an edit start instruction for the three-dimensional shape 32 from a user, the CPU 12A reads the editing program from the ROM 12B and executes the editing program. It is to be noted that the content of editing specified by an edit start instruction is such editing using a reference point and a reference axis, represented by rotation and the like, for instance, and the three-dimensional shape 32 to be edited is assumed to be pre-selected by a user.

The edit processing illustrated in FIG. 12 differs from the edit processing of FIG. 3 described in the first exemplary embodiment in that steps S2 and S4 have been added, and for other processing, the same processing as the edit processing described in FIG. 3 is performed. Thus, hereinafter, the edit processing illustrated in FIG. 12 will be described, focusing on the point of difference from the edit processing illustrated in FIG. 3.

First, in step S2, the CPU 12A obtains the overlap region 36 of the three-dimensional shape 32 before editing is performed. As already described, the overlap region 36 of the three-dimensional shape 32 is obtained by performing the AND operation on the bit sequences of multiple three-dimensional shapes 32 in the three-dimensional coordinate space.

Figure 13:
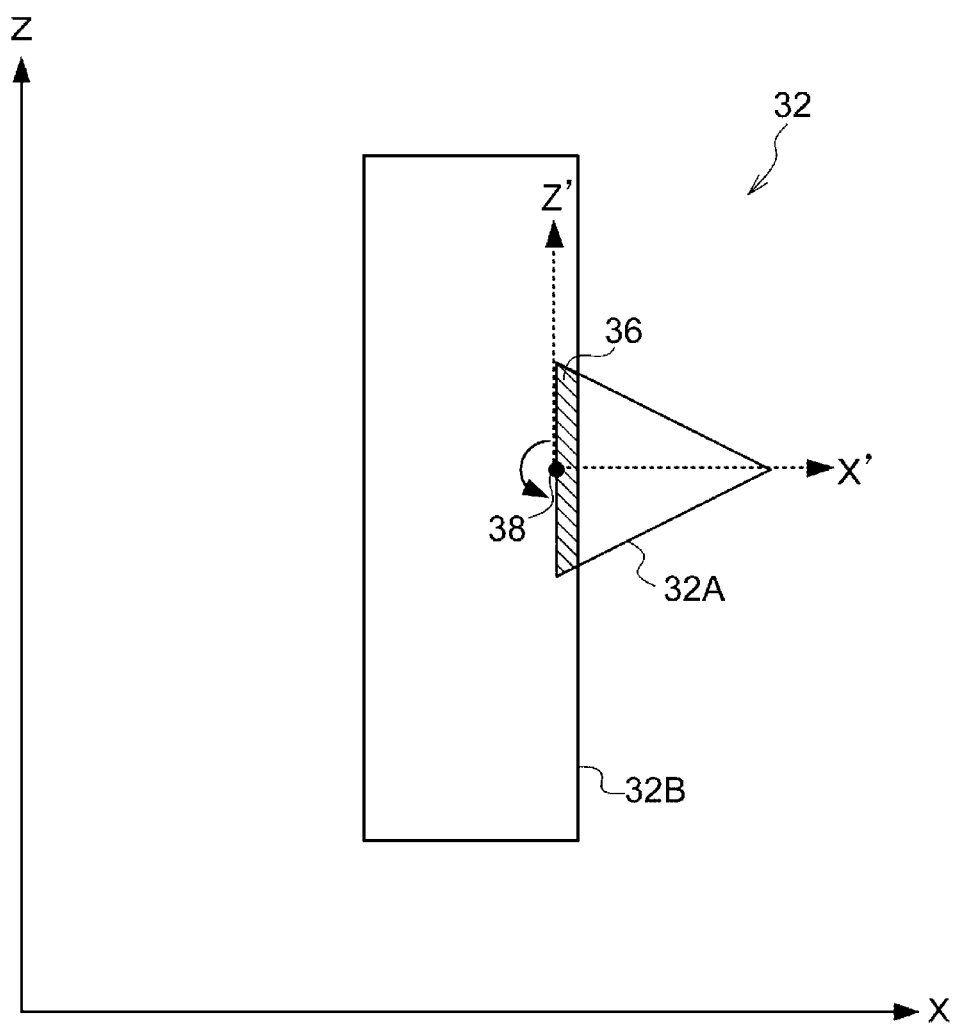
FIG. 13 is a diagram illustrating an example of a reference point.

For instance, as illustrated in FIG. 13, when the three-dimensional shape 32 is configured to include two parts of the three-dimensional shape 32A and the three-dimensional shape 32B, the overlap region 36 is obtained.

In step S4, the CPU 12A sets a reference point for editing in the range of the overlap region 36 selected in step S2. Also, the CPU 12A sets a reference axis with respect to the reference point which is set. In the example of FIG. 13, a point set in the outline surface of the overlap region 36 serves as a reference point 38, and the line segments, which pass through the reference point 38 and are along respective directions of X, Y, Z axes, serve as reference axes X', Y', Z'. It is to be noted that although the reference axis Y' is not illustrated in FIG. 13, the reference axis Y' is a reference axis that is along the direction perpendicular to each of the reference axis X' and the reference axis Z'.

Although the example of FIG. 13 has been described using an example of rotation about the reference axis Y' out of editing of the three-dimensional shape 32 using a reference point and a reference axis, it goes without saying that rotation about the reference axis X' and the reference axis Y' is also performed by the same control.

The reference point 38 may be set to any position as long as the position is within the range of the overlap region 36, and it goes without saying that the reference point 38 may be set not only on the outline surface of the overlap region 36, but also inside the overlap region 36. For instance, the reference point 38 may be set to the centroid point of the overlap region 36 or a point closest to the origin of the three-dimensional coordinate space.

Figure 14:
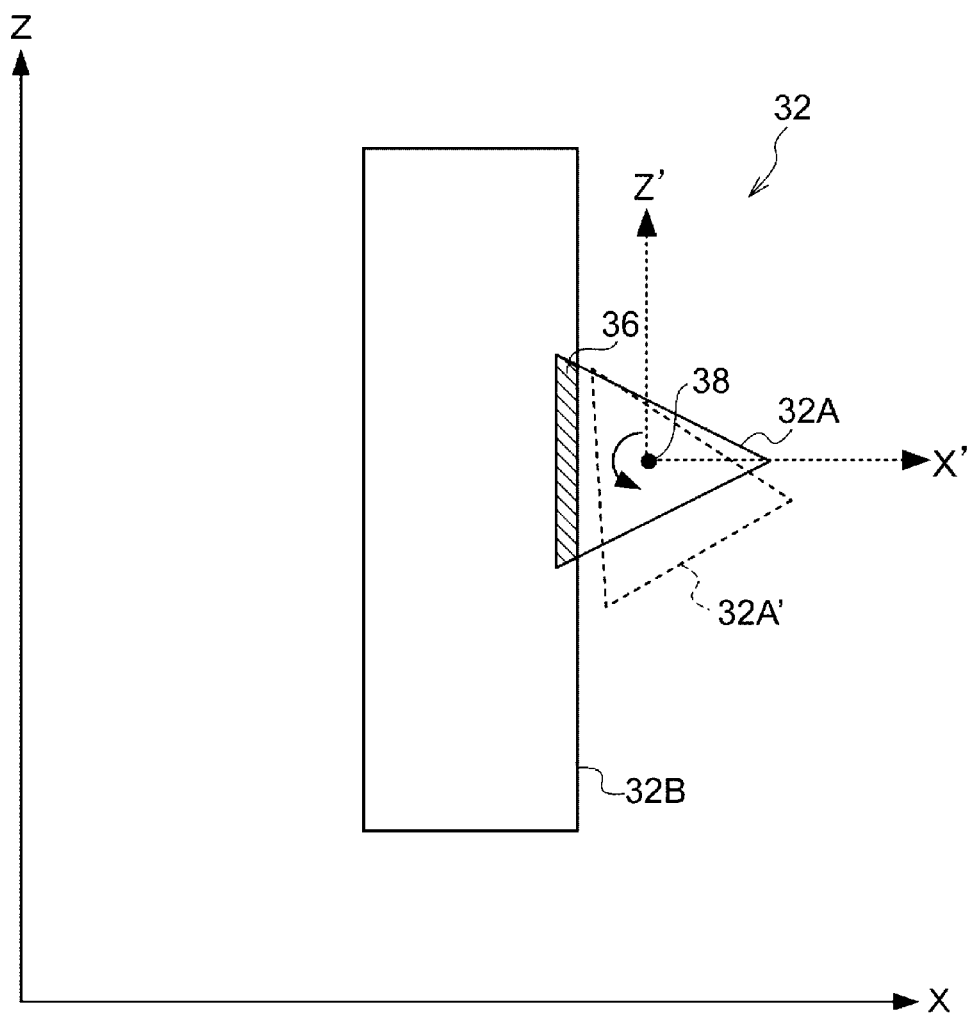
FIG. 14 is a diagram illustrating an example of editing when a reference point is set outside the range of an overlap region.

As illustrated in FIG. 14, for instance, the reference point 38 is set to a position of the three-dimensional shape 32A, different from the overlap region 36, and the three-dimensional shape 32A is rotated about the reference axis, serving as the rotational axis, in the Y-axis direction, passing through the reference point 38. In this case, when the three-dimensional shape 32A is rotated to the position indicated by the three-dimensional shape 32A', the three-dimensional shape 32A leaves the three-dimensional shape 32B, and the restriction conditions, which are applied to editing of a model object integrally configured including the three-dimensional shapes 32A, 32B, are no longer satisfied.

Therefore, the CPU 12A preferably sets the reference point 38 in the overlap region 36 of the three-dimensional shape 32.

Hereinafter, the CPU 12A obtains an amount of rotation in step S10, the amount of rotation being an example of the amount of operation, then the CPU 12A performs editing to rotate the three-dimensional shape 32A by the obtained amount of rotation about the reference axis set in step S4 as the rotational axis. It is to be noted that the CPU 12A, determines whether or not an overlap region 36 is present in the three-dimensional shape 32 in step S20, and controls the editing so that the overlap region 36 is not lost by the editing.

Although the examples of FIGS. 13 and 14 have been described using an example of rotation about the reference axis Y' out of editing of the three-dimensional shape 32 using a reference point and a reference axis, it goes without saying that rotation about the reference axis X' and the reference axis Y' is also performed by the same control. Also, although the setting of the reference point 38 and the reference axis has been described above using an example of editing to rotate the three-dimensional shape 32A, the reference point 38 and the reference axis are set also in editing to enlarge and reduce the three-dimensional shape 32A.

Figure 15:
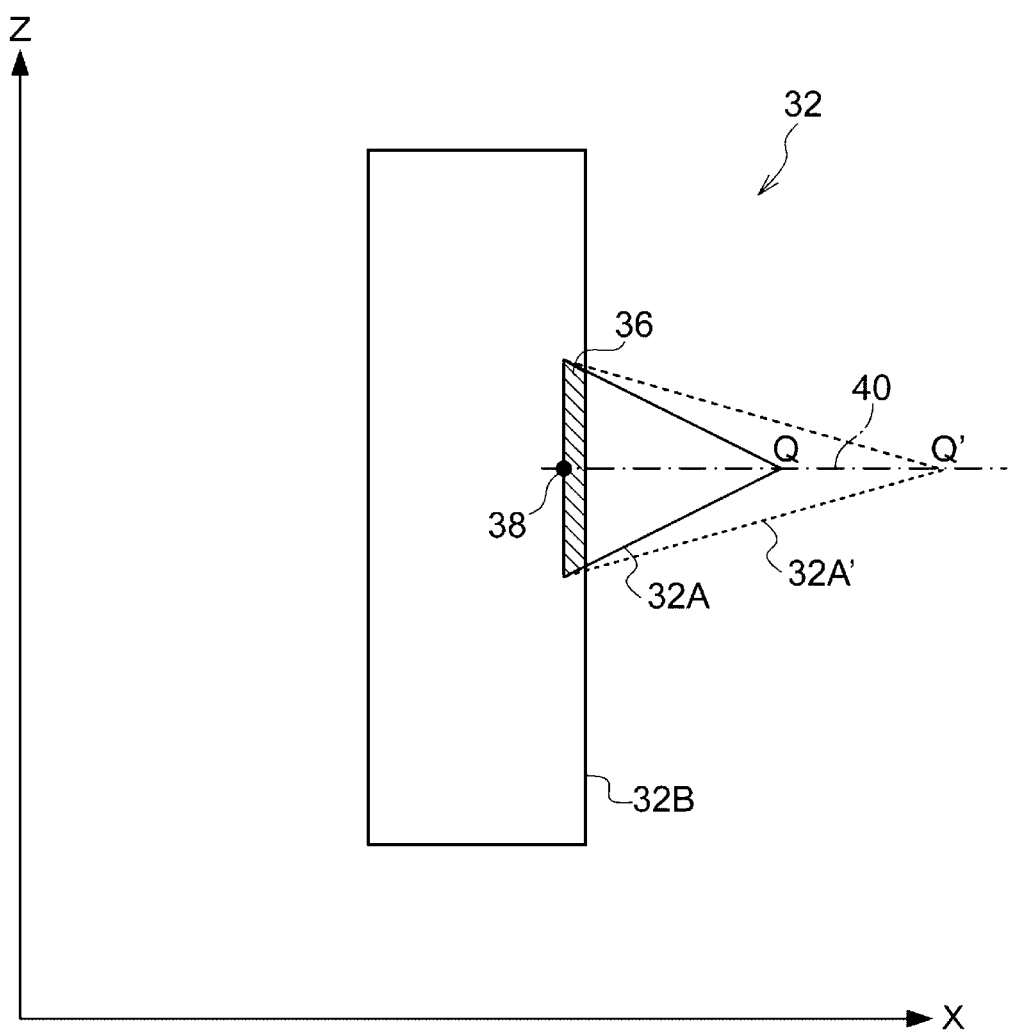
FIG. 15 is a diagram illustrating an example of a reference point and a reference axis in association with enlargement editing.

FIG. 15 is a diagram illustrating an example of editing to enlarge the three-dimensional shape 32A. In the example illustrated in FIG. 15, a point set in the outline surface of the overlap region 36 serves as the reference point 38, and a line segment (reference axis X') along the X-axis serves as a reference axis 40. It is to be noted that the reference axis 40 may be set in an enlargement direction specified by a user. As illustrated in FIG. 15, the reference point 38 is set within the range of the overlap region 36. Thus, even when the three-dimensional shape 32A is enlarged at the center of the reference point 38 by an enlargement factor which causes vertex Q of the three-dimensional shape 32A to move to the position of Q' in the direction of the reference axis 40, the three-dimensional shape 32A' obtained by enlarging the three-dimensional shape 32A does not leave the three-dimensional shape 32B.

Figure 16:
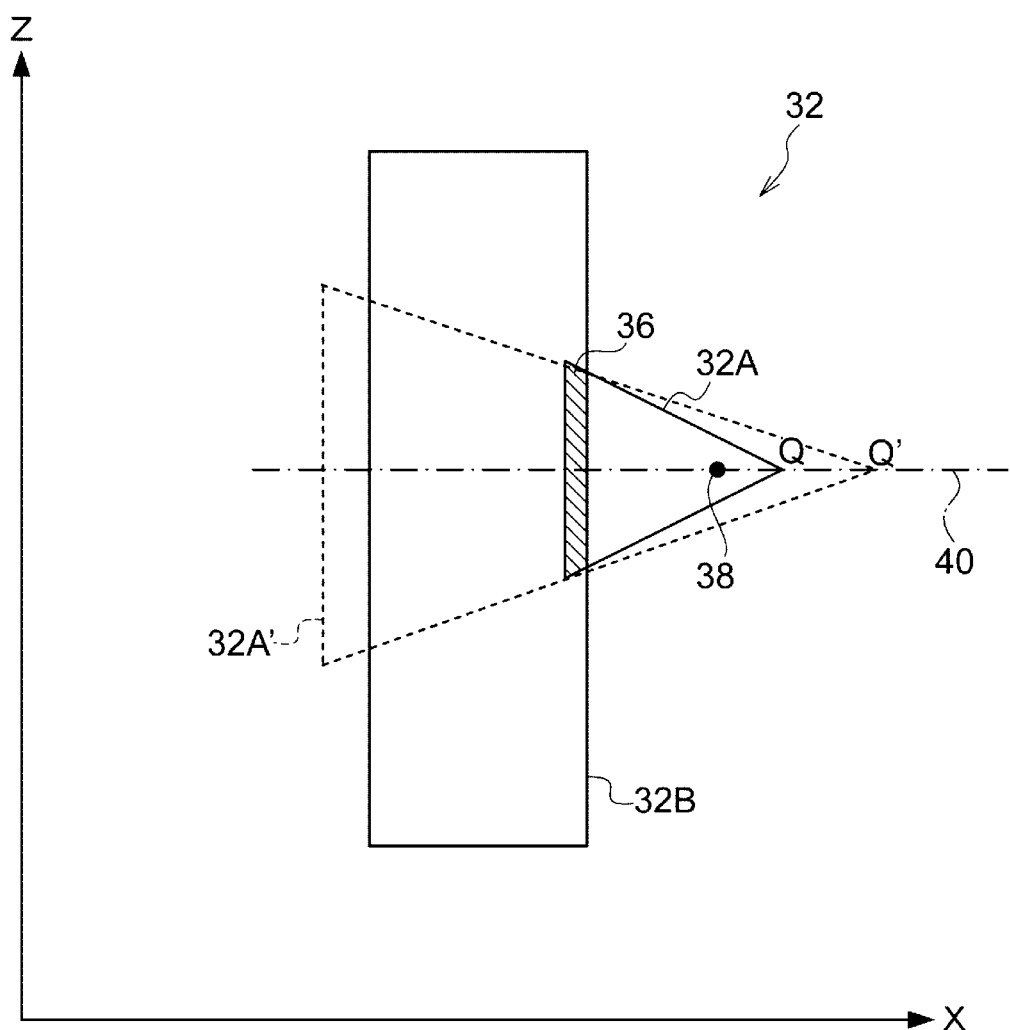
FIG. 16 is a diagram illustrating an example of enlargement editing when a reference point is set outside the range of an overlap region.

However, as illustrated in FIG. 16, when the reference point 38 is set to a position of the three-dimensional shape 32A different from the overlap region 36, and the three-dimensional shape 32A is enlarged at the center of the reference point 38 by an enlargement factor which causes the vertex Q of the three-dimensional shape 32A to move to the position of Q', editing to cause the enlarged three-dimensional shape 32A' to penetrate through the three-dimensional shape 32B may be performed. In this case, although the overlap region 36 is present between the three-dimensional shape 32A and the three-dimensional shape 32B, the three-dimensional shape 32A' penetrates through the three-dimensional shape 32B serving as the base, which results in editing deviated from the original purpose of enlarging the three-dimensional shape 32A that projects from the three-dimensional shape 32B. Therefore, the editing device 10 preferably sets the reference point 38 in the overlap region 36 of the three-dimensional shape 32.

Figure 17:
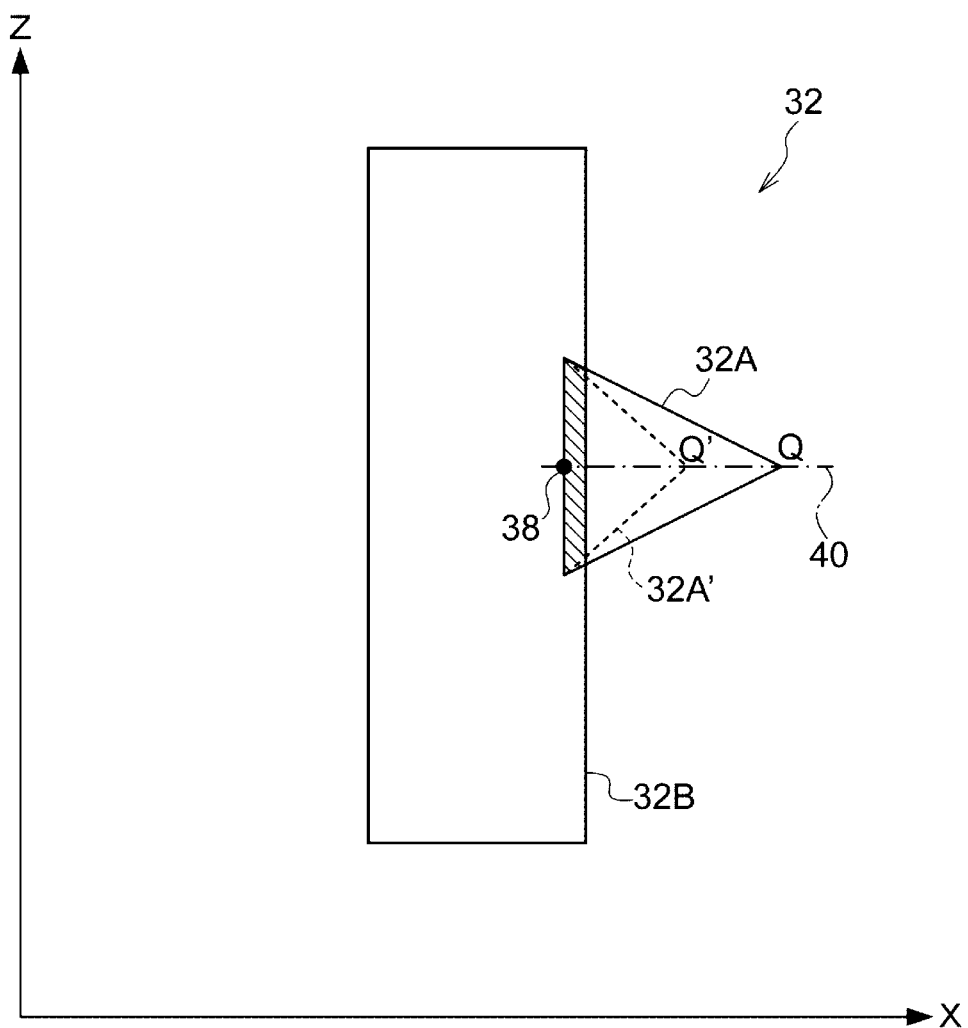
FIG. 17 is a diagram illustrating an example of a reference point and a reference axis in association with reduction editing.

FIG. 17 is a diagram illustrating an example of editing to reduce the three-dimensional shape 32A. In the example illustrated in FIG. 17, a point set in the outline surface of the overlap region 36 serves as the reference point 38, and a line segment (reference axis X') along the X-axis serves as a reference axis 40. It is to be noted that the reference axis 40 may be set in a reduction direction specified by a user. As illustrated in FIG. 17, the reference point 38 is set within the range of the overlap region 36. Thus, even when the three-dimensional shape 32A is reduced at the center of the reference point 38 by a reduction factor which causes vertex Q of the three-dimensional shape 32A to move to the position of Q' in the direction of the reference axis 40, the three-dimensional shape 32A' obtained by reducing the three-dimensional shape 32A does not leave the three-dimensional shape 32B.

Figure 18:
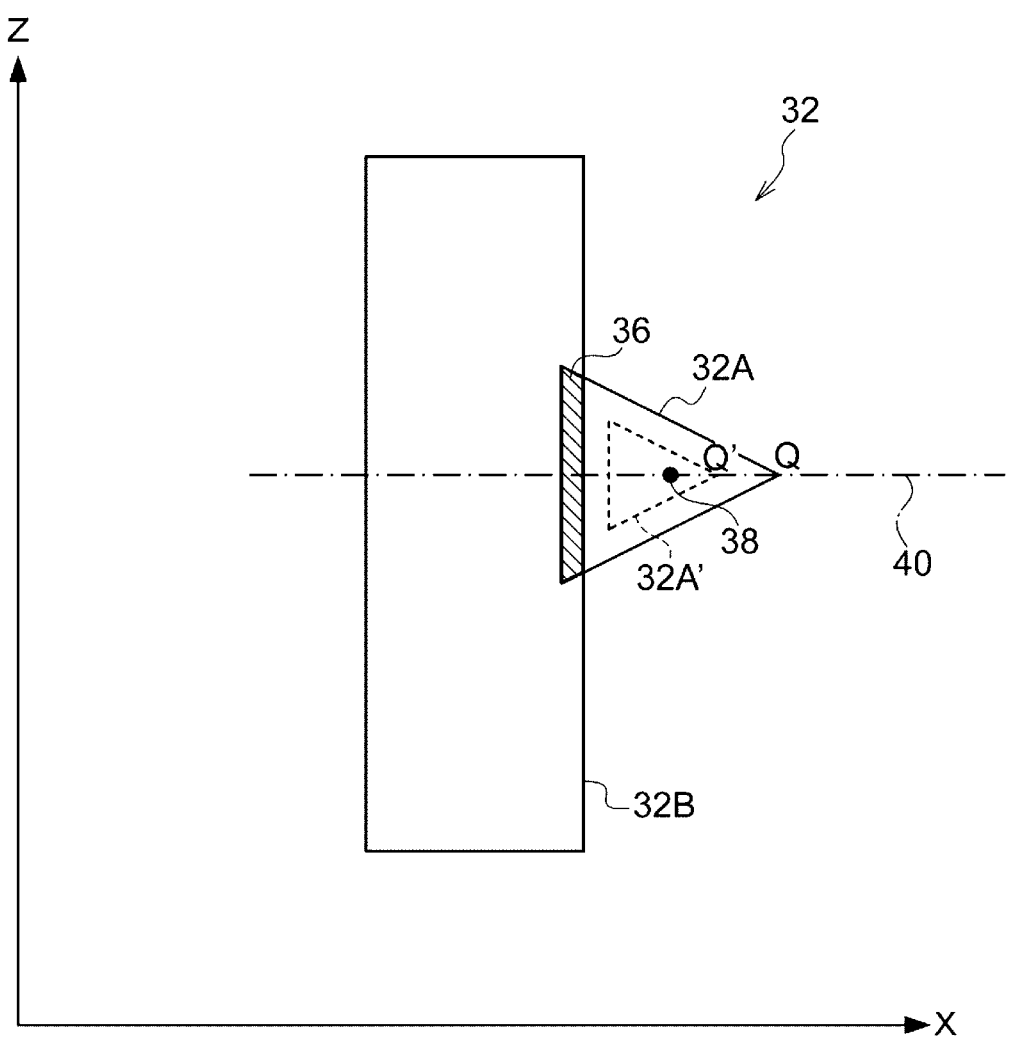
FIG. 18 is a diagram illustrating an example of reduction editing when a reference point is set outside the range of an overlap region.

However, as illustrated in FIG. 18, when the reference point 38 is set to a position of the three-dimensional shape 32A different from the overlap region 36, and the three-dimensional shape 32A is reduced at the center of the reference point 38 by a reduction factor which causes the vertex Q of the three-dimensional shape 32A to move to the position of Q', editing to cause the reduced three-dimensional shape 32A' to leave the three-dimensional shape 32B may be performed. Therefore, the editing device 10 preferably sets the reference point 38 in the overlap region 36 of the three-dimensional shape 32.

It is to be noted that although the editing device 10 sets one reference point 38 in the above-described example, multiple candidates for the reference point 38 may be presented for each overlap region 36 on the display 16, and at least one reference point 38 may be selected by a user.

Also, although the editing device 10 sets the reference axis 40 in accordance with the direction specified by a user, the editing device 10 may set the reference axis 40 without an instruction from a user. The editing device 10 may set an axis, which allows editing with presence of an overlap region 36 for any amount of operation to be performed, to the reference axis 40, for instance. Setting the reference axis 40 by the editing device 10 reduces the possibility of editing that is not intended by a user, thus the operability for editing of the three-dimensional shape 32 is improved.

In this manner, when editing the three-dimensional shape data using the reference point 38 and the reference axis 40, the editing device 10 sets the reference point 38 within the range of the overlap region 36 as well as the reference axis 40 serving as a reference for editing, such as a rotational axis or a symmetrical axis of the three-dimensional shape 32, for instance. Consequently, the three-dimensional shape 32A to be edited does not leave the three-dimensional shape 32B serving as the base, and thus the editing device 10 reduces the possibility of editing not intended by a user.

Although in the examples of FIGS. 15 to 18, the enlargement and reduction of the three-dimensional shape 32 in the direction of the reference axis X' have been described, it goes without saying that the enlargement and reduction of the three-dimensional shape 32 in the directions of the reference axis Y' and the reference axis Z' are also performed by the same control.

Modifications of First Exemplary Embodiment and Second Exemplary Embodiment

Although the three-dimensional shape 32 according to the first exemplary embodiment and the second exemplary embodiment has illustrated a configuration example in which one three-dimensional shape 32A to be edited and one three-dimensional shape 32B serving as the base are provided, the three-dimensional shape 32A or 32B may be configured by multiple three-dimensional shapes 32.

Figure 19:
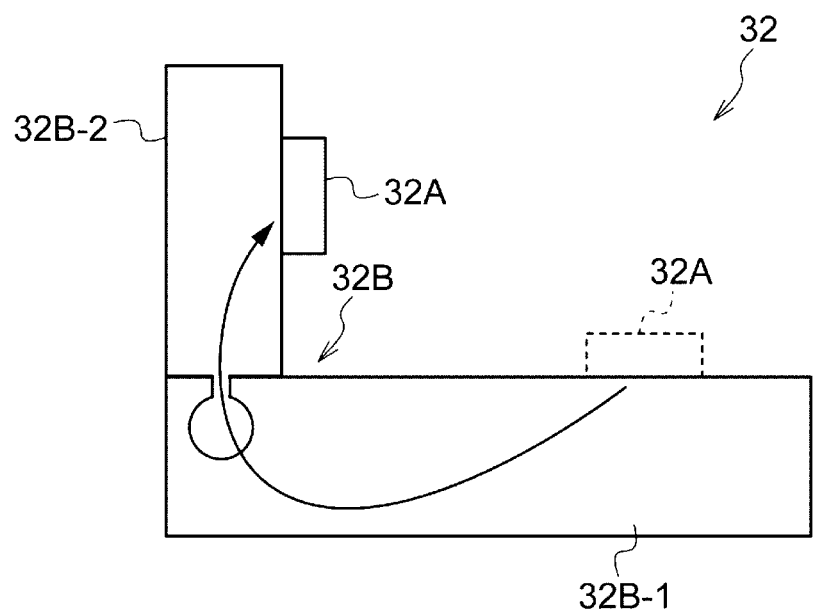
FIG. 19 is a diagram illustrating an example of a three-dimensional shape in which three-dimensional shape serving as the base is configured by multiple three-dimensional shapes.

FIG. 19 is a diagram illustrating an example of the three-dimensional shape 32, in which the three-dimensional shape 32B serving as the base is configured to include a three-dimensional shape 32B-1 and a three-dimensional shape 32B-2.

When an overlap region 36 is present in the three-dimensional shape 32B-1 and the three-dimensional shape 32B-2, the editing device 10 handles the three-dimensional shape 32B-1 and the three-dimensional shape 32B-2 as one integrated three-dimensional shape 32B.

In other words, in the determination processing in step S20 illustrated in FIGS. 3 and 12, the editing device 10 identifies the three-dimensional shape 32B as the shape combining the three-dimensional shape 32B-1 and the three-dimensional shape 32B-2, and generates a bit sequence. Thus, as illustrated in FIG. 19, the editing device 10 permits editing to move the three-dimensional shape 32A which overlaps with the three-dimensional shape 32B-1 to the three-dimensional shape 32B-2.

Figure 20:
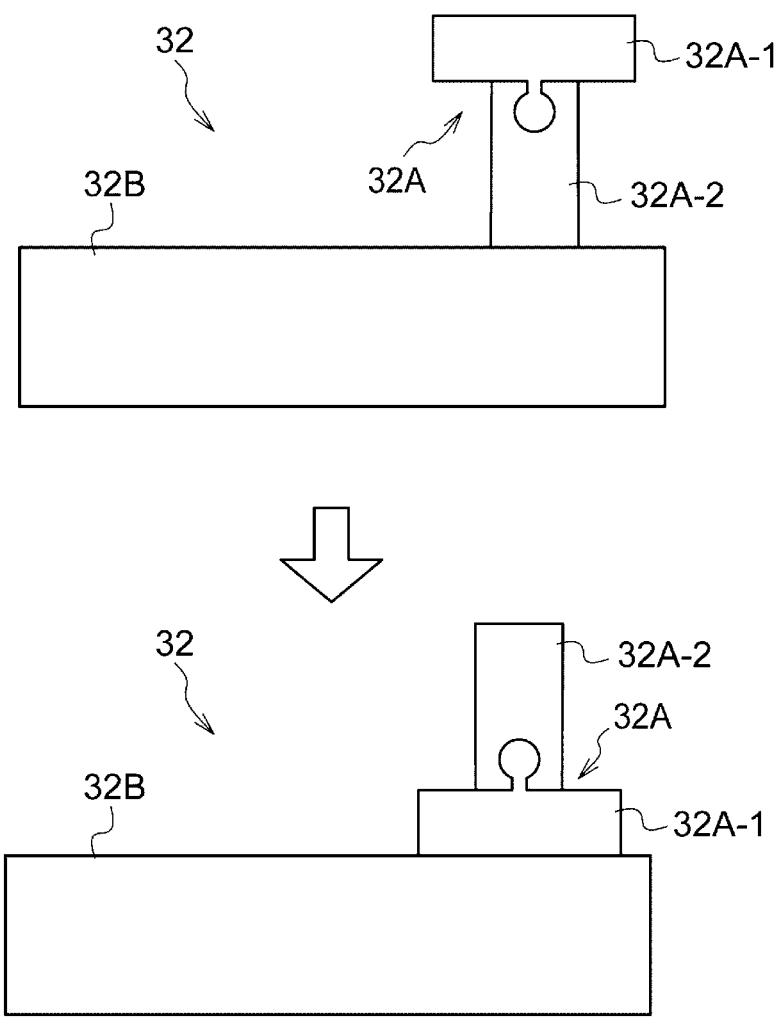
FIG. 20 is a diagram illustrating an example of a three-dimensional shape in which a three-dimensional shape to be edited is configured by multiple three-dimensional shapes.

In contrast, FIG. 20 is a diagram illustrating an example of the three-dimensional shape 32, in which the three-dimensional shape 32A to be edited is configured to include a three-dimensional shape 32A-1 and a three-dimensional shape 32A-2.

When an overlap region 36 is present in the three-dimensional shape 32A-1 and the three-dimensional shape 32A-2, the editing device 10 handles the three-dimensional shape 32A-1 and the three-dimensional shape 32A-2 as one integrated three-dimensional shape 32A.

In other words, in the determination processing in step S20 illustrated in FIGS. 3 and 12, the editing device 10 identifies the three-dimensional shape 32A as the shape combining the three-dimensional shape 32A-1 and the three-dimensional shape 32A-2, and generates a bit sequence. Thus, as illustrated in FIG. 20, the editing device 10 permits editing to rotate the three-dimensional shape 32A in which the three-dimensional shape 32A-2 initially overlaps with the three-dimensional shape 32B, and to cause the three-dimensional shape 32A-1 to overlap with the three-dimensional shape 32B.

In this manner, handling multiple three-dimensional shapes as one three-dimensional shape, the flexibility of editing of the three-dimensional shape 32 is improved.

Third Exemplary Embodiment

In the editing device 10 according to the first exemplary embodiment and the second exemplary embodiment, and in a modification, editing is controlled so that the three-dimensional shape 32A to be edited does not leave the three-dimensional shape 32B serving as the base.

However, depending on the content of editing for the three-dimensional shape 32, editing may be desired such that the three-dimensional shape 32A to be edited temporarily leaves the three-dimensional shape 32B serving as the base.

Figure 21:
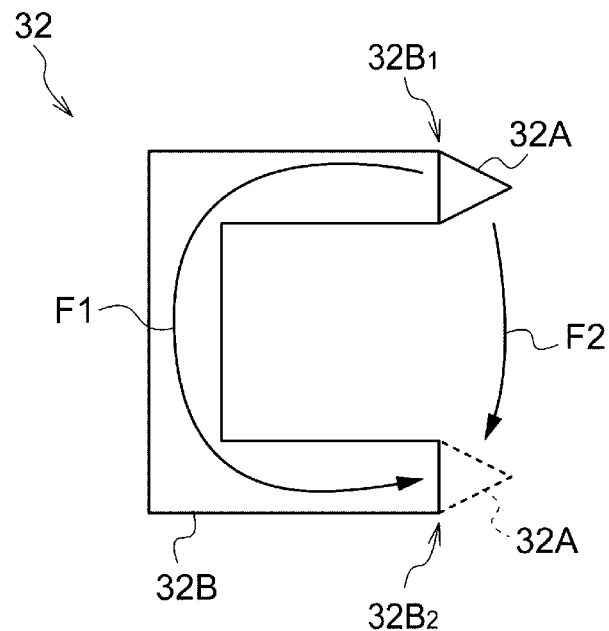
FIG. 21 is a diagram illustrating an example of a three-dimensional shape which desirably leaves by editing.

FIG. 21 is a diagram illustrating an example of the three-dimensional shape 32 which is configured to include the three-dimensional shape 32A and the three-dimensional shape 32B.

The three-dimensional shape 32B is a U-shaped three-dimensional shape having two projections 32B1, 32B2, and the three-dimensional shape 32A is attached to the leading end of one projection unit 32B1.

When the three-dimensional shape 32A is moved to the other projection 32B2 of the three-dimensional shape 32B, the editing device 10 according to the first exemplary embodiment and the second exemplary embodiment has to move the three-dimensional shape 32A along the path indicated by arrow F1 so that the three-dimensional shape 32A does not leave the three-dimensional shape 32B. However, since the path indicated by arrow F2 is shorter than the path indicated by arrow F1, some users may feel stressed for moving the three-dimensional shape 32A along a detour.

Figure 22:
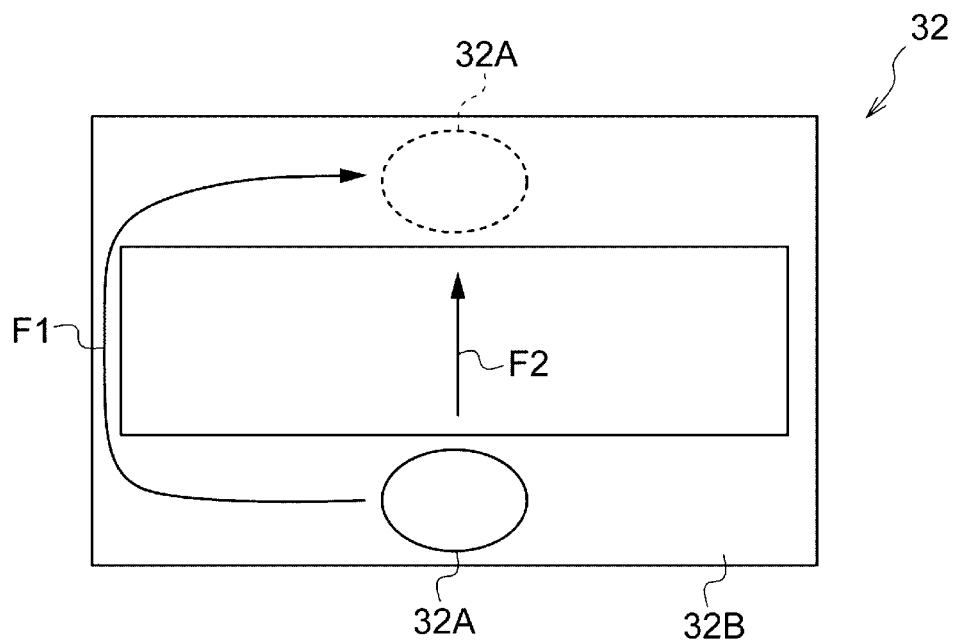
FIG. 22 is a diagram illustrating an example of a three-dimensional shape which desirably leaves by editing.

FIG. 22 is also a diagram illustrating an example of the three-dimensional shape 32 which is configured to include the three-dimensional shape 32A and the three-dimensional shape 32B.

An opening is provided in the center of the three-dimensional shape 32B, and the three-dimensional shape 32A is attached to one end of the three-dimensional shape 32B with respect to the opening.

When the three-dimensional shape 32A is moved to the other end at the position with respect to the opening, the editing device 10 according to the first exemplary embodiment and the second exemplary embodiment has to move the three-dimensional shape 32A along the path indicated by arrow F1 so that the three-dimensional shape 32A does not leave the three-dimensional shape 32B. However, since the path indicated by arrow F2 which crosses the opening is shorter than the path indicated by arrow F1, some users may feel stressed for moving the three-dimensional shape 32A along a detour.

Hereinafter, the operation of an editing device 10A that permits the overlap region 36 to be lost temporarily during editing will be described. The configuration of the editing device 10A is the same as the configuration of the editing device 10 illustrated in FIG. 1.

Figure 23:
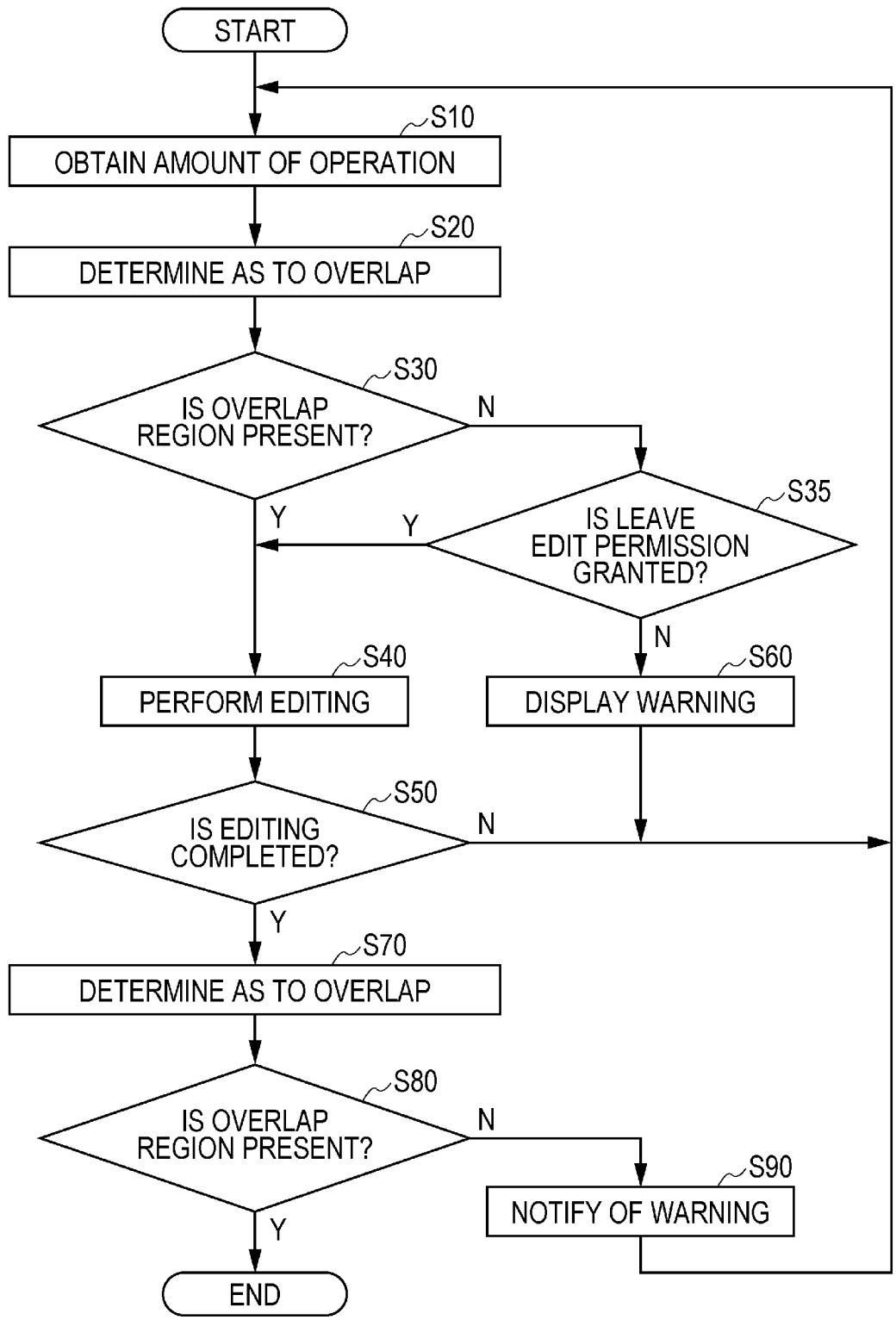
FIG. 23 is a flowchart illustrating an example of a flow of edit processing of three-dimensional shape data according to a third exemplary embodiment.

FIG. 23 is a flowchart illustrating an example of a flow of edit processing of three-dimensional shape data performed by the editing device 10A. An editing program, which defines the edit processing of three-dimensional shape data, is pre-stored in the ROM 12B, and for instance, when receiving an edit start instruction for the three-dimensional shape 32 from a user, the CPU 12A reads the editing program from the ROM 12B and executes the editing program.

The edit processing illustrated in FIG. 23 differs from the edit processing of FIG. 3 described in the first exemplary embodiment in that step S35, S70, S80, and S90 have been added. For other processing, the same processing as the edit processing described in FIG. 3 is performed. Thus, hereinafter, the edit processing illustrated in FIG. 23 will be described, focusing on the point of difference from the edit processing illustrated in FIG. 3.

When it is determined that an overlap region 36 is not present in the three-dimensional shape 32A to be edited in step S30, the flow proceeds to step S35.

In step S35, the CPU 12A determines whether or not leave editing permission has been received, which permits editing to cause the three-dimensional shape 32A to leave the three-dimensional shape 32B so that the overlap region 36 is lost. The CPU 12A is notified of the leave editing permission by a user who operates the operating portion 14.

When the leave editing permission has not been received, the flow proceeds to step S60, and similarly to the editing device 10, the CPU 12A controls the editing so that the three-dimensional shape 32A to be edited does not leave the three-dimensional shape 32B serving as the base.

On the other hand, when the leave editing permission has been received, the flow proceeds to step S40, and the CPU 12A performs editing. In other words, even when editing is performed, which causes the three-dimensional shape 32A to leave the three-dimensional shape 32B, if leave editing permission is granted, the editing is continuously performed. Consequently, editing such as moving the three-dimensional shape 32A along the path indicated by the arrow F2 of FIGS. 21 and 22 is permitted.

When completion of editing is determined in step S50 and an instruction for completing editing is received, the flow proceeds to step S70.

In step S70, the CPU 12A performs the same processing as in step S20, and determines whether or not the three-dimensional shape 32A at the completion of editing is at a position which allows overlap with the three-dimensional shape 32B serving as the base.

In step S80, when the CPU 12A determines in the overlap determination in step S70 that an overlap region 36 is not present between the three-dimensional shape 32A and the three-dimensional shape 32B, the flow proceeds to step S90.

In step S90, similarly to step S60, the CPU 12A displays a warning on the display 16 so that editing is performed without letting the three-dimensional shape 32A to be edited leave the three-dimensional shape 32B serving as the base. The flow proceeds to step S10, and the CPU 12A stays on standby until the amount of the next operation associated with editing is obtained. In other words, the CPU 12A ensures that the three-dimensional shape 32A does not leave the three-dimensional shape 32B at the completion time of editing. When the three-dimensional shape 32A leaves the three-dimensional shape 32B, even if an instruction for completing editing is received, the CPU 12A allows a user to continue the editing of the three-dimensional shape 32 until the three-dimensional shape 32A overlaps with the three-dimensional shape 32B.

Alternatively, when the three-dimensional shape 32A leaves the three-dimensional shape 32B and an instruction for completing editing is received, editing is automatically performed by the CPU 12A so that the three-dimensional shape 32A overlaps with a nearby three-dimensional shape 32B, and the editing of the three-dimensional shape 32 may be completed. In this case, it is preferable to provide users with a message for notifying in advance that the three-dimensional shape 32 is to be automatically edited to have overlap or a message for notifying that the three-dimensional shape 32 has been automatically edited to have overlap.

On the other hand, when the determination processing in step S80 indicates an affirmative determination, the edit processing of the three-dimensional shape data illustrated in FIG. 23 is completed.

It is to be noted that the editing device 10A may also handle the three-dimensional shape 32A configured by multiple three-dimensional shapes as one integrated three-dimensional shape 32A. Also, the editing device 10A may also handle the three-dimensional shape 32B configured by multiple three-dimensional shapes as one integrated three-dimensional shape 32B.

Figure 24:
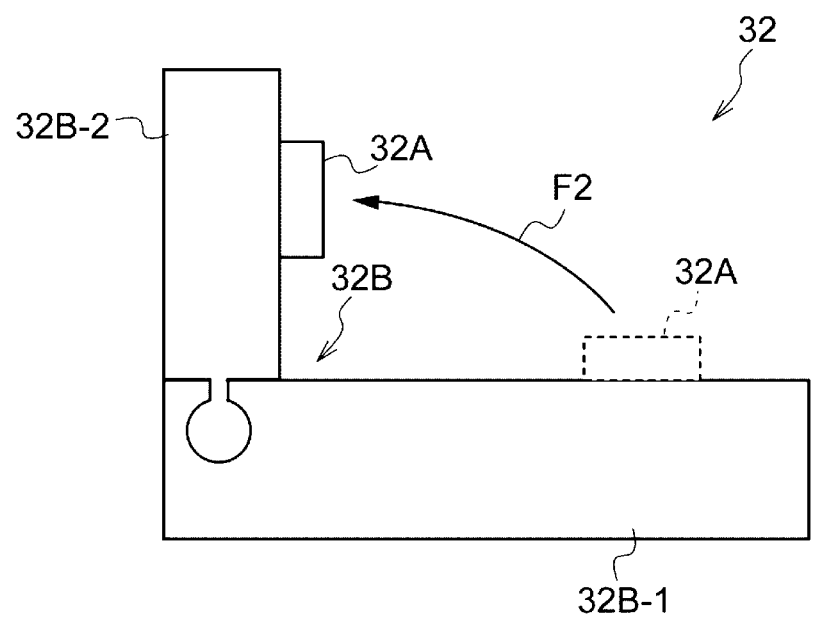
FIG. 24 is a diagram illustrating an example of editing of a three-dimensional shape when leave editing permission is granted.

FIG. 24 is a diagram illustrating an example of the three-dimensional shape 32, in which the three-dimensional shape 32B serving as the base is configured by a three-dimensional shape 32B-1 and a three-dimensional shape 32B-2.

The editing device 10A handles the three-dimensional shape 32B-1 and the three-dimensional shape 32B-2 as one integrated three-dimensional shape 32B. Thus, the editing device 10A permits editing to cause the three-dimensional shape 32A to leave the three-dimensional shape 32B-1 and to be moved to the three-dimensional shape 32B-2 along the path indicated by arrow F2 of FIG. 24.

Like this, when receiving leave editing permission from a user, the editing device 10A permits editing to cause the three-dimensional shape 32A to be edited to leave the three-dimensional shape 32B serving as the base. After receiving an instruction for completing editing, the editing device 10A determines whether or not the three-dimensional shape 32A overlap with the three-dimensional shape 32B, and when no overlap is present, the editing device 10A prompts a user to redo editing. Therefore, the editing device 10A improves the flexibility of editing, and reduces the possibility of editing not intended by a user.

Here, although the operation of the editing device 10A has been described using an example of movement of the three-dimensional shape 32A, it goes without saying that the edit processing illustrated in FIG. 23 is applied to other editing such as rotation, enlargement, and reduction.

Fourth Exemplary Embodiment

Figure 25:
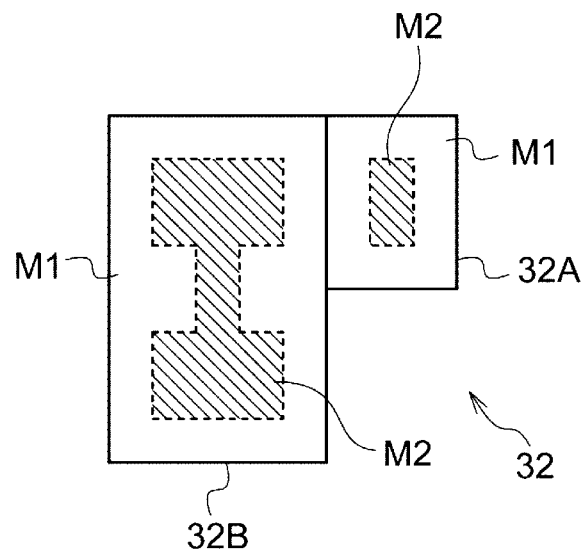
FIG. 25 is a diagram illustrating an example of editing of a three-dimensional shape which has an attribute.

For instance, as illustrated in FIG. 25, even when portions of the three-dimensional shape 32A and the three-dimensional shape 32B overlap with each other, the editing device 10 according to the first exemplary embodiment and the second exemplary embodiment, and the editing device 10A according to the third exemplary embodiment each determine that the three-dimensional shapes 32A, 32B overlap with each other.

As already described, various attributes are designated to the voxels 34 which configurate the three-dimensional shape 32. Thus, it is assumed that regions composed of different material M1 and material M2 are designated to the three-dimensional shapes 32A, 32B illustrated in FIG. 25.

Figure 26:
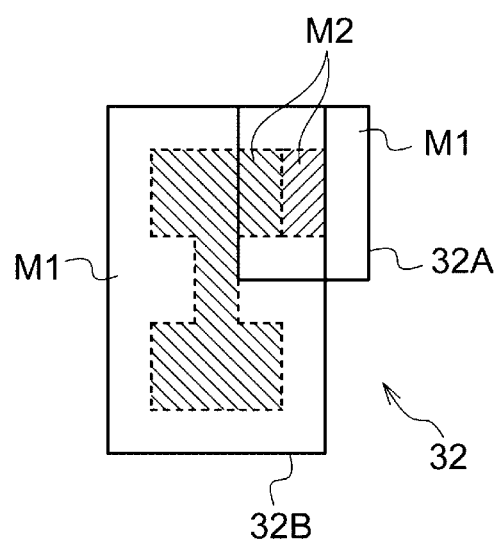
FIG. 26 is a diagram illustrating an example of editing to cause overlap of the same attribute to occur.

In this case, it is easier to connect the same materials than to connect different materials, and the strength of a connection portion is maintained. Therefore, as illustrated in FIG. 26, depending on conditions, a situation may occur in which three-dimensional shape data is preferably edited so that the regions designated as material "M2" overlap with each other, for instance.

In a fourth exemplary embodiment, an editing device 10B, which edits three-dimensional shape data so that regions having the same attribute overlap with each other, will be described. It is to be noted that the configuration of the editing device 10B is the same as the configuration of the editing device 10 illustrated in FIG. 1.

Figure 27:
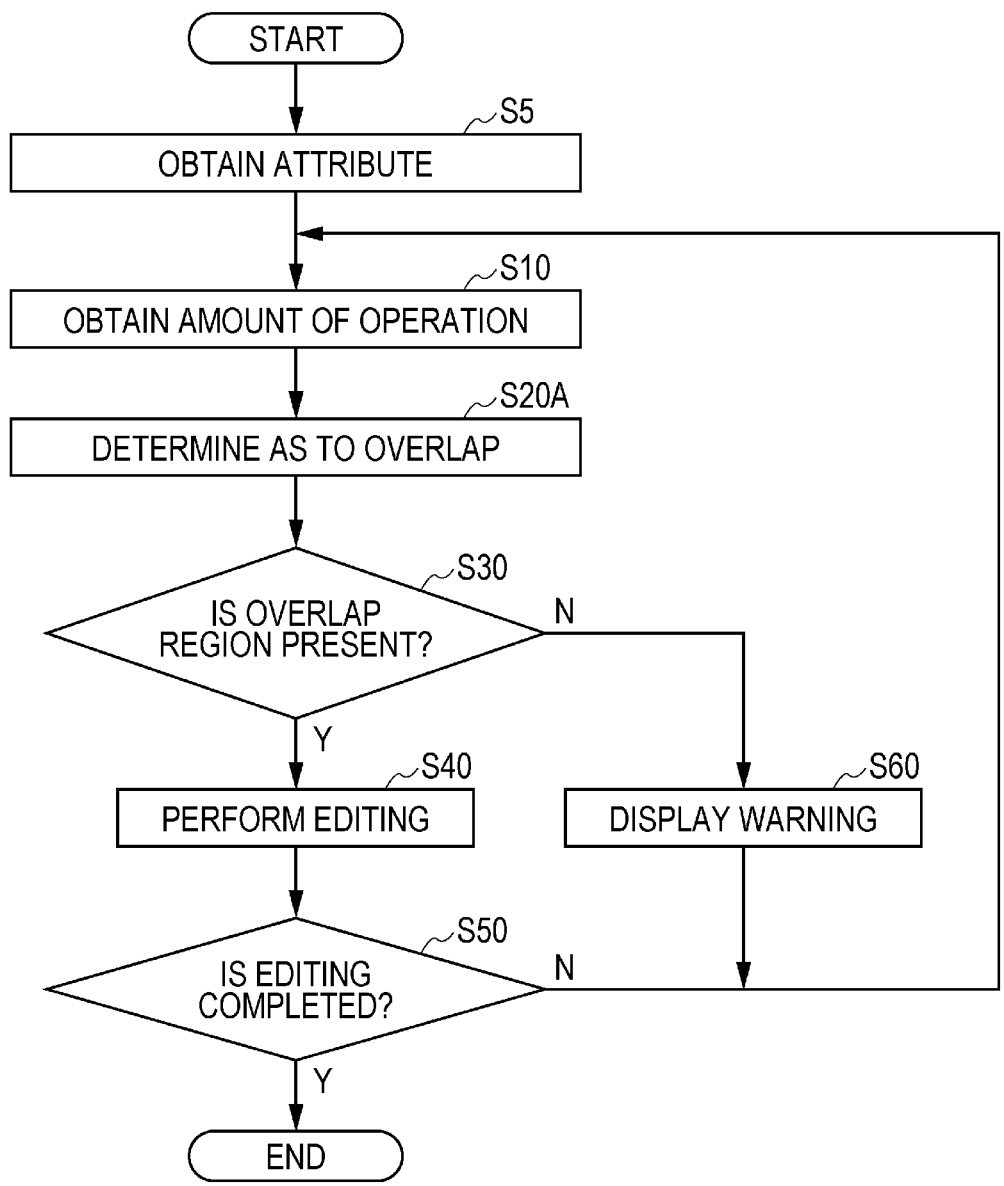
FIG. 27 is a flowchart illustrating an example of a flow of edit processing of three-dimensional shape data according to a fourth exemplary embodiment.

FIG. 27 is a flowchart illustrating an example of a flow of edit processing of three-dimensional shape data performed by the editing device 10B. An editing program, which defines the edit processing of three-dimensional shape data, is pre-stored in the ROM 12B, and for instance, when receiving an edit start instruction for the three-dimensional shape 32 from a user, the CPU 12A reads the editing program from the ROM 12B and executes the editing program.

The edit processing illustrated in FIG. 27 differs from the edit processing of FIG. 3 described in the first exemplary embodiment in that step S20 is replaced by step S20A. For other processing, the same processing as the edit processing described in FIG. 3 is performed. Thus, hereinafter, the edit processing illustrated in FIG. 27 will be described using an example of the three-dimensional shape 32 illustrated in FIG. 25, focusing on the point of difference from the edit processing illustrated in FIG. 3.

First, in step S5, the CPU 12A obtains an attribute of each of the three-dimensional shape 32A and the three-dimensional shape 32B. The type of attribute obtained is designated by a user via the operating portion 14, for instance. In the example of FIG. 25, since editing is performed to cause regions having the same material to overlap with each other, "material" is obtained as the type of attribute, and for instance, "material M2" is obtained as the material to be determined.

In step S20A, the CPU 12A calculates the position of the edited three-dimensional shape 32A based on the amount of operation obtained in step S10, and represents the three-dimensional shape 32A and the three-dimensional shape 32B each by a bit sequence in the three-dimensional coordinate space under the assumption that the three-dimensional shape 32A is at the calculated position. In this process, the CPU 12A represent the three-dimensional shape 32A and the three-dimensional shape 32B each by a bit sequence related to the attribute obtained in step S5.

Figure 28:
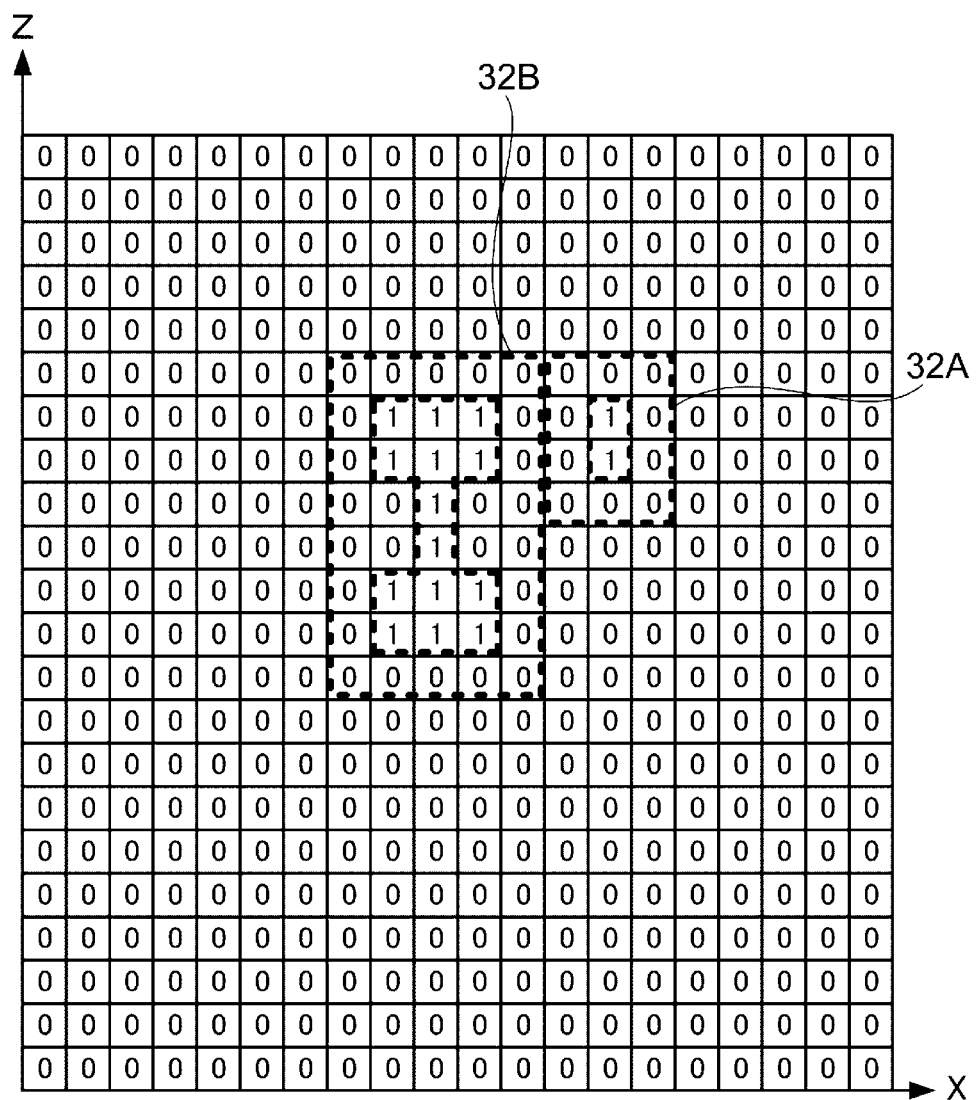
FIG. 28 is a diagram illustrating an example of a bit sequence that represents a three-dimensional shape.

FIG. 28 is a diagram illustrating an example of a bit sequence that represents the three-dimensional shape 32 illustrated in FIG. 25. In FIG. 28, the element value of the coordinates, to which the material of "M2" to be determined for an attribute is assigned, of the three-dimensional shape 32 is set to "1", and the element value of other coordinates is set to "0".

The CPU 12A performs the AND operation on a bit sequence representing the three-dimensional shape 32A and a bit sequence representing the three-dimensional shape 32B, thereby extracting an overlap region 36 where overlap of the materials M2 occurs. The CPU 12A then determines whether or not editing is performed, which causes a region of the three-dimensional shape 32A having an attribute of the material M2 to overlap with a region of the three-dimensional shape 32B having an attribute of the material M2.

It is to be noted that when performing the AND operation, the CPU 12A changes the element value of the coordinates adjacent to a region of the material M2 in the three-dimensional shape 32A to be edited to "1", and performs the AND operation. Thus, the case where the surface of a region composed of the material M2 out of the three-dimensional shape 32A, and the surface of a region composed of the material M2 out of the three-dimensional shape 32B are in contact is also determined to be a state of overlap.

Hereinafter, when overlap of the material M2 is not recognized in step S30, a warning is displayed in step S60, and the CPU 12A controls the editing so that the region of the material M2 in the three-dimensional shape 32A does not leave the region of the material M2 in the three-dimensional shape 32B.

Like this, the editing device 10B according to the fourth exemplary embodiment extracts a region where overlap of the same attribute occurs, as the overlap region of the three-dimensional shape 32. An attribute to be determined for an overlap region is selected in various manners, and editing of the three-dimensional shape 32 according to a purpose is performed.

It is to be noted that multiple attributes to be determined for an overlap region may be selected. In this case, in step S20A of FIG. 27, when overlap occurs in a region including at least one attribute out of the selected multiple types of attributes, the region may be extracted as the overlap region 36, or when overlap occurs in a region including all the selected attributes, the region may be extracted as the overlap region 36.

Although the present disclosure has been described above using the exemplary embodiment, the present disclosure is not limited to the scope of the exemplary embodiment. Various modifications or improvements may be made to the exemplary embodiment without departing from the gist of the present disclosure, and the exemplary embodiment to which the modifications or improvements are made is also included in the technical scope of the present disclosure.

For instance, the edit processing of three-dimensional shape data illustrated in FIG. 3, FIG. 12, FIG. 23, and FIG. 27 may be implemented by hardware such as an application specific integrated circuit (ASIC). In this case, faster processing is achieved as compared with the case where the edit processing is implemented by software.

Also, in the exemplary embodiment, although a case has been described where the editing program for three-dimensional shape data is installed in the ROM 12B, the exemplary embodiment is not limited to this. The editing program for three-dimensional shape data according to the exemplary embodiment of the invention may be provided in the form of computer readable medium. For instance, the editing program according to the exemplary embodiment of the invention may be provided in the form of recording in an optical disk such as a compact disc (CD)-ROM and a digital versatile disc (DVD)-ROM or in a semiconductor memory such as a universal serial bus (USB) memory and a memory card. Also, the editing program for three-dimensional shape data according to the exemplary embodiment of the invention may be obtained from an external device via a communication line connected to the communicator 18.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An editing device for three-dimensional shape data, comprising:
    a memory storing program instructions; and
    at least one processor executing the instructions to perform:
        extracting an overlap region, between a first three-dimensional shape and a second three-dimensional shape, by comparing portions of the first three-dimensional shape to portions of the second three-dimensional shape;
        determining whether the overlap region is maintained after an editing of the first three-dimensional shape; and
        in response to determining that the overlap region is not maintained after the editing of the first three-dimensional shape, outputting a warning indicating that the overlap region is absent,
    wherein outputting the warning comprises outputting at least one of a visual warning and an auditory warning, and
    where the at least one processor is further configured to execute the instructions to perform, in response to an output of the warning, automatically returning at least a first portion of the first three-dimensional shape to the overlap region.

2. The editing device for three-dimensional shape data according to claim 1, wherein the at least one processor further executes the instructions to perform:
    selecting, when one or more overlap regions including the overlap region are extracted, the one or more overlap regions as a target region to be kept for overlap with the second three-dimensional shape.

3. The editing device for three-dimensional shape data according to claim 2,
    wherein the at least one processor further executes the instructions to perform setting a reference point and a reference axis which serve as reference for editing the first three-dimensional shape in the selected one or more overlap regions.

4. The editing device for three-dimensional shape data according to claim 3,
    wherein the at least one processor further executes the instructions to perform editing of the first three-dimensional shape so that the reference point does not leave the second three-dimensional shape.

5. The editing device for three-dimensional shape data according to claim 4, wherein the at least one processor further executes the instructions to perform:
    receiving an instruction to permit the one or more overlap regions to be lost; and
    when the instruction is received, permitting editing of the first three-dimensional shape to cause the one or more overlap regions to be lost.

6. The editing device for three-dimensional shape data according to claim 5,
    wherein the at least one processor further executes the instructions to perform permitting editing of a third three-dimensional shape which overlaps with the second three-dimensional shape, the editing causing overlap with the first three-dimensional shape.

7. The editing device for three-dimensional shape data according to claim 4,
    wherein the at least one processor further executes the instructions to perform permitting editing of a third three-dimensional shape which overlaps with the second three-dimensional shape, the editing causing overlap with the first three-dimensional shape.

8. The editing device for three-dimensional shape data according to claim 3, wherein the at least one processor further executes the instructions to perform:
    receiving an instruction to permit the one or more overlap regions to be lost; and when the instruction is received, permitting editing of the first three-dimensional shape to cause the one or more overlap regions to be lost.

9. The editing device for three-dimensional shape data according to claim 8,
wherein the at least one processor further executes the instructions to perform permitting editing of a third three-dimensional shape which overlaps with the second three-dimensional shape, the editing causing overlap with the first three-dimensional shape.

10. The editing device for three-dimensional shape data according to claim 3,
wherein the at least one processor further executes the instructions to perform permitting editing of a third three-dimensional shape which overlaps with the second three-dimensional shape, the editing causing overlap with the first three-dimensional shape.

11. The editing device for three-dimensional shape data according to claim 2, wherein the at least one processor further executes the instructions to perform:
receiving an instruction to permit the one or more overlap regions to be lost; and
when the instruction is received, permitting editing of the first three-dimensional shape to cause the one or more overlap regions to be lost.

12. The editing device for three-dimensional shape data according to claim 11,
wherein the at least one processor further executes the instructions to perform permitting editing of a third three-dimensional shape which overlaps with the second three-dimensional shape, the editing causing overlap with the first three-dimensional shape.

13. The editing device for three-dimensional shape data according to claim 2,
wherein the at least one processor further executes the instructions to perform permitting editing of a third three-dimensional shape which overlaps with the second three-dimensional shape, the editing causing overlap with the first three-dimensional shape.

14. The editing device for three-dimensional shape data according to claim 1, wherein the at least one processor further executes the instructions to perform:
receiving an instruction to permit the one or more overlap regions to be lost; and
when the instruction is received, permitting editing of the first three-dimensional shape to cause the one or more overlap regions to be lost.

15. The editing device for three-dimensional shape data according to claim 14,
wherein the at least one processor further executes the instructions to perform permitting editing of a third three-dimensional shape which overlaps with the second three-dimensional shape, the editing causing overlap with the first three-dimensional shape.

16. The editing device for three-dimensional shape data according to claim 1,
wherein the at least one processor further executes the instructions to perform permitting editing of a third three-dimensional shape which overlaps with the second three-dimensional shape, the editing causing overlap with the first three-dimensional shape.

17. The editing device for three-dimensional shape data according to claim 1,
wherein the at least one processor further executes the instructions to perform permitting editing of a third three-dimensional shape which overlaps with the first three-dimensional shape, the editing causing overlap with the second three-dimensional shape.

18. The editing device for three-dimensional shape data according to claim 1,
wherein the portions of the first three-dimensional shape and the portions of the second three-dimensional shape are voxels which have various attributes, and
wherein the at least one processor further executes the instructions to perform extracting regions having the same attribute as the one or more overlap regions from regions where three-dimensional shapes overlap with each other.

19. The editing device for three-dimensional shape data according to claim 1,
wherein the at least one processor further executes the instructions to perform extracting an overlap region by representing a three-dimensional shape in terms of a bit sequence and performing a bitwise operation on the bit sequence.

20. The editing device according to claim 1,
wherein editing the first three-dimensional shape comprises changing at least one of a position and a size of the first three-dimensional shape relative to the second three-dimensional shape,
wherein extracting the overlap region comprises determining, before the editing, whether the portions of the first three-dimensional shape overlap the portions of the second three-dimensional shape,
wherein determining whether the overlap region is maintained after the editing comprises determining whether the portions of the first three-dimensional shape overlap the portions of the second three-dimensional shape, and
wherein the portions of the first three-dimensional shape and the portions of the second three-dimensional shape are voxels.

21. The editing device according to claim 1,
wherein the overlap region indicates that the first three-dimensional shape and the second three-dimensional shape are in contact throughout an entire area bounded by the overlap region,
wherein comparing the portions of the first three-dimensional shape to the portions of the second three-dimensional shape comprises comparing a first bit sequence of the first three-dimensional shape to a second bit sequence of the second three-dimensional shape, and
wherein determining whether the overlap region is maintained, after the editing, comprises comparing a third bit sequence of the first three-dimensional shape to the second bit sequence of the second three-dimensional shape.

22. An editing device for three-dimensional shape data, comprising:
a memory storing program instructions; and
at least one processor executing the instructions to perform:
extracting an overlap region, between a first three-dimensional shape and a second three-dimensional shape, by comparing portions of the first three-dimensional shape to portions of the second three-dimensional shape;
determining whether the overlap region is maintained after an editing of the first three-dimensional shape; and
in response to determining that the overlap region is not maintained after the editing of the first three-dimensional shape, outputting a warning indicating that the overlap region is absent, wherein the overlap region indicates that the first three-dimensional shape and the second three-dimensional shape are in contact throughout an entire area bounded by the overlap region, wherein comparing the portions of the first three-dimensional shape to the portions of the second three-dimensional shape comprises comparing a first bit sequence of the first three-dimensional shape to a second bit sequence of the second three-dimensional shape, and wherein determining whether the overlap region is maintained, after the editing, comprises comparing a third bit sequence of the first three-dimensional shape to the second bit sequence of the second three-dimensional shape.

23. A non-transitory computer readable medium storing an editing program causing a computer to execute a process, the process comprising:

extracting an overlap region, between a first three-dimensional shape and a second three-dimensional shape, by comparing portions of the first three-dimensional shape to portions of the second three-dimensional shape;

determining whether the overlap region is maintained after an editing of the first three-dimensional shape; and in response to determining that the overlap region is not maintained after the editing of the first three-dimensional shape, outputting a warning indicating that the overlap region is absent, wherein outputting the warning comprises outputting at least one of a visual warning and an auditory warning, and wherein the process further comprises executing the instructions to perform, in response to an output of the warning, automatically returning at least a first portion of the first three-dimensional shape to the overlap region.

* * * * *